(12) United States Patent
Kang

(10) Patent No.: US 10,769,602 B2
(45) Date of Patent: *Sep. 8, 2020

(54) SYSTEM AND METHOD FOR CUSTOMER INITIATED PAYMENT TRANSACTION USING CUSTOMER'S MOBILE DEVICE AND CARD

(71) Applicant: Soo Hyang Kang, Brea, CA (US)

(72) Inventor: Soo Hyang Kang, Brea, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/919,112

(22) Filed: Mar. 12, 2018

(65) Prior Publication Data

US 2018/0204195 A1 Jul. 19, 2018

Related U.S. Application Data

(63) Continuation-in-part of application No. 15/703,841, filed on Sep. 13, 2017, which is a continuation-in-part of application No. 15/605,808, filed on May 25, 2017, and a continuation-in-part of application No. 15/679,072, filed on Aug. 16, 2017, which is a
(Continued)

(30) Foreign Application Priority Data

Jan. 3, 2017 (KR) .................. 10-2017-0000669

(51) Int. Cl.
| | | |
|---|---|---|
| G06K 7/08 | (2006.01) |
| G06Q 20/10 | (2012.01) |
| G06Q 20/32 | (2012.01) |
| G06Q 20/02 | (2012.01) |
| G06Q 20/40 | (2012.01) |
| G06Q 20/36 | (2012.01) |
| G06Q 20/34 | (2012.01) |
| G06Q 20/06 | (2012.01) |

(52) U.S. Cl.
CPC ......... *G06Q 20/102* (2013.01); *G06Q 20/027* (2013.01); *G06Q 20/06* (2013.01); *G06Q 20/3227* (2013.01); *G06Q 20/3276* (2013.01); *G06Q 20/3278* (2013.01); *G06Q 20/351* (2013.01); *G06Q 20/36* (2013.01); *G06Q 20/40* (2013.01)

(58) Field of Classification Search
CPC ..... G06Q 30/06; G06Q 30/0601; G06Q 20/20
USPC ................... 235/451, 383, 385, 492, 472.02
See application file for complete search history.

(56) References Cited

U.S. PATENT DOCUMENTS

| 9,648,451 B1 | 5/2017 | Lee |
| 9,760,871 B1 * | 9/2017 | Pourfallah ............. G06Q 50/22 |

(Continued)

FOREIGN PATENT DOCUMENTS

| WO | WO9849658 A1 | 11/1998 |
| WO | WO2017000061 A1 | 1/2017 |
| WO | WO2017021757 A1 | 2/2017 |

*Primary Examiner* — Daniel St. Cyr
(74) *Attorney, Agent, or Firm* — Heedong Chae; Lucem, PC

(57) ABSTRACT

A system for a customer initiated payment transaction includes a mobile device of a customer, a merchant including merchant information and payment information, a multi-payment gateway, and a network. The mobile device includes a digital wallet, on which a customer may register one or more of a plurality of payment methods. Payment methods include credit card, debit card, virtual cards, cryptocurrency, and loyalty points.

18 Claims, 22 Drawing Sheets

Related U.S. Application Data continuation-in-part of application No. 15/665,333, filed on Jul. 31, 2017.

(56) References Cited

U.S. PATENT DOCUMENTS

| | | | |
|---|---|---|---|
| 2001/0024371 A1* | 9/2001 | Pastrick | B60Q 1/2665 |
| | | | 326/494 |
| 2011/0218871 A1* | 9/2011 | Singh | G06Q 20/10 |
| | | | 705/17 |
| 2012/0150669 A1* | 6/2012 | Langley | G06Q 30/0601 |
| | | | 705/16 |
| 2013/0097078 A1* | 4/2013 | Wong | G06Q 20/027 |
| | | | 705/44 |
| 2013/0238455 A1* | 9/2013 | Laracey | G06Q 20/108 |
| | | | 705/21 |
| 2014/0019352 A1* | 1/2014 | Shrivastava | G06Q 20/3674 |
| | | | 705/41 |
| 2014/0108166 A1* | 4/2014 | Murphy | G06Q 30/06 |
| | | | 705/16 |
| 2014/0136350 A1 | 5/2014 | Savolainen | |
| 2014/0257958 A1* | 9/2014 | Andrews | G06Q 30/0226 |
| | | | 705/14.27 |
| 2014/0263627 A1 | 9/2014 | Wyatt | |
| 2015/0186871 A1* | 7/2015 | Laracey | G06Q 20/3278 |
| | | | 705/41 |
| 2016/0267486 A1 | 9/2016 | Mitra et al. | |

* cited by examiner

FIG. 19
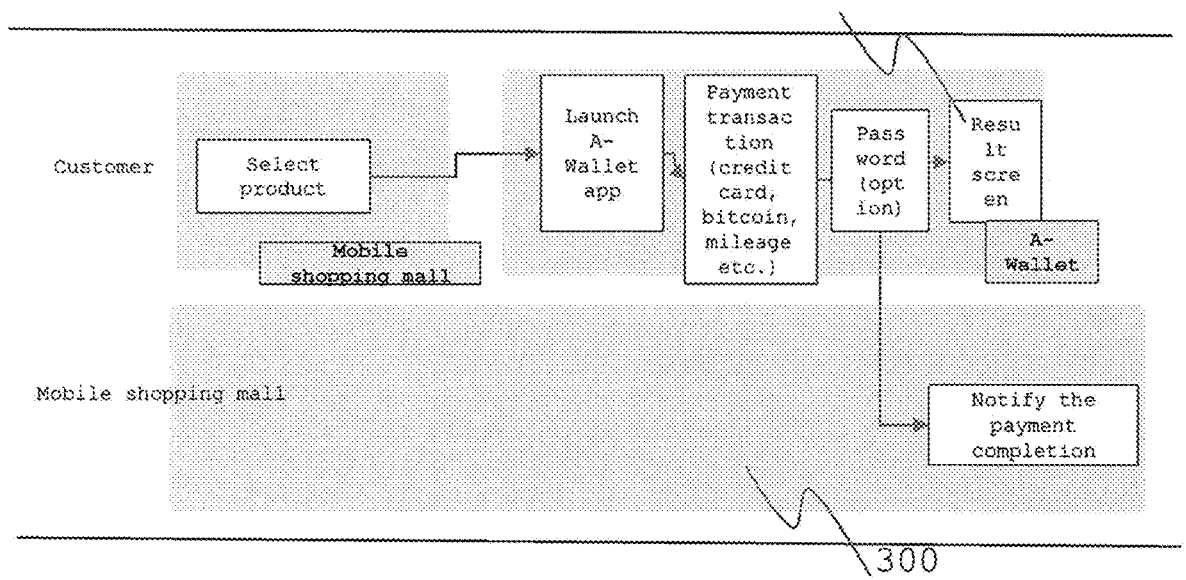
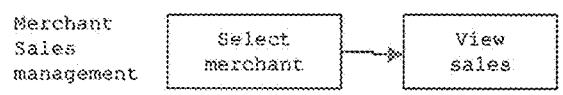
FIG. 20
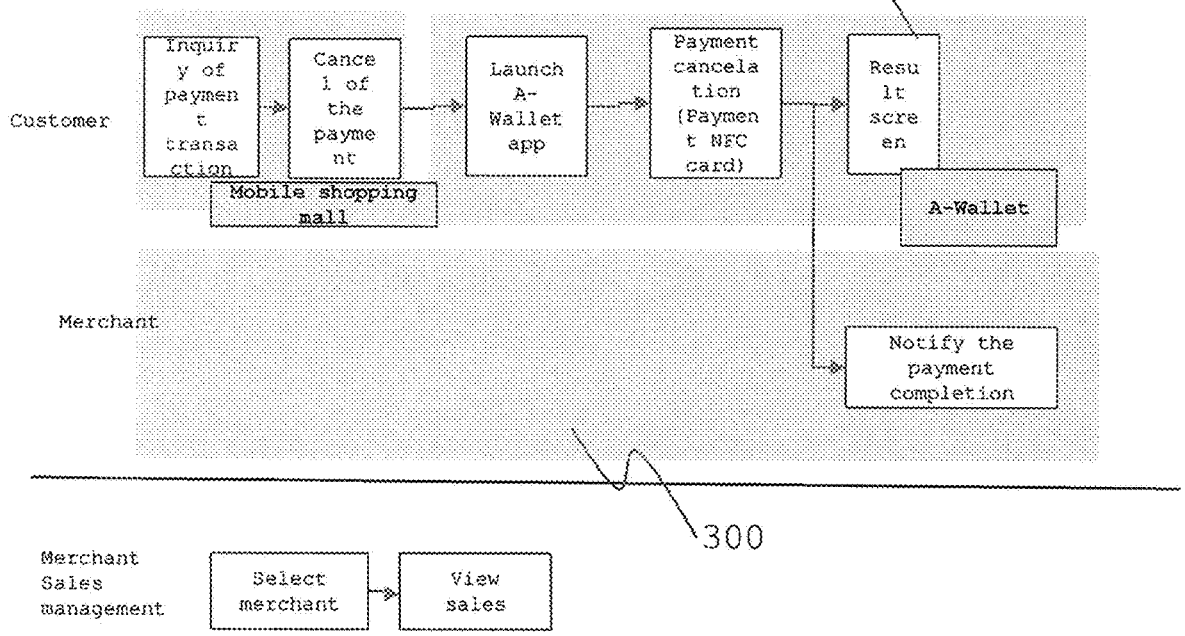

FIG. 21
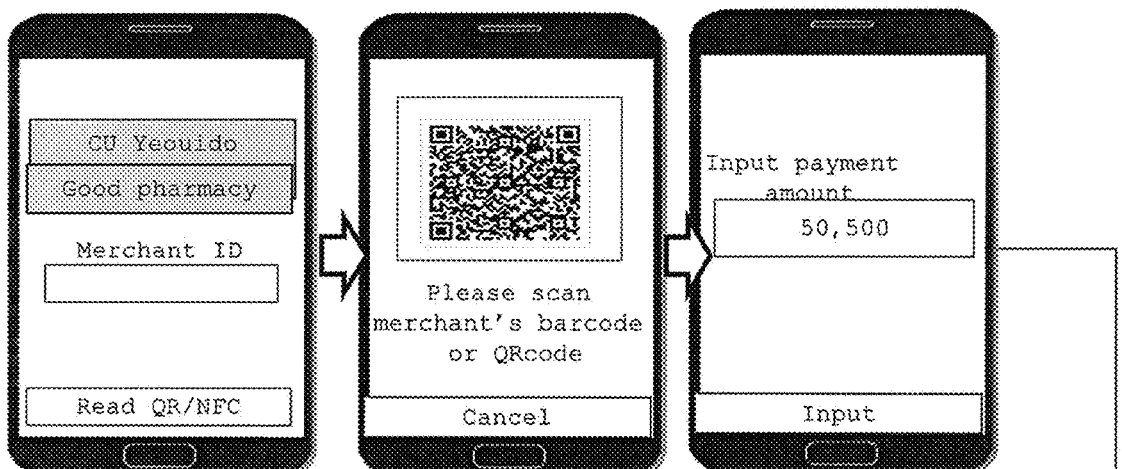
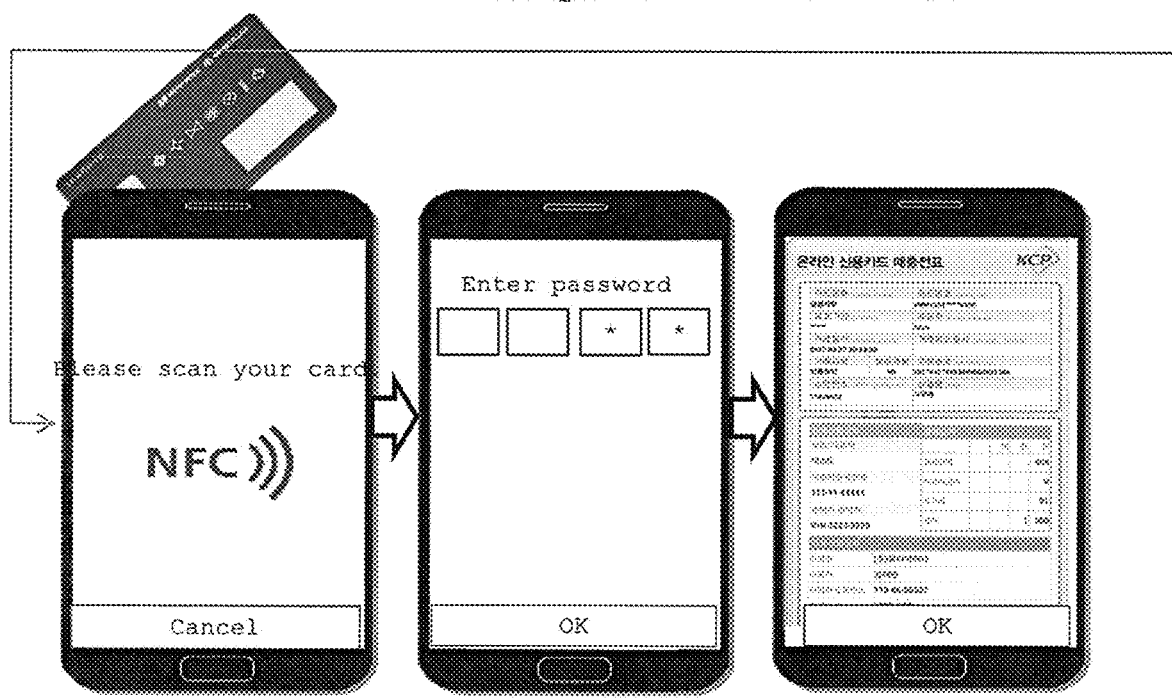

FIG. 25

| Screen | Explanation |
|---|---|
| | View total sales history by date |

SYSTEM AND METHOD FOR CUSTOMER INITIATED PAYMENT TRANSACTION USING CUSTOMER'S MOBILE DEVICE AND CARD

CROSS-REFERENCE TO RELATED APPLICATIONS

This application is a continuation-in-part of and claims priority to U.S. patent application Ser. No. 15/703,841, filed on Sep. 13, 2017, which is a continuation-in-part application of U.S. patent application Ser. No. 15/605,808, filed on May 25, 2017, which claims priority to Korean patent application no. 10-2017-0000669 filed on Jan. 3, 2017, and U.S. patent application Ser. No. 15/679,072, filed Aug. 16, 2017, which is a continuation-in-part of U.S. patent application Ser. No. 15/665,333 filed on Jul. 31, 2017, the disclosures of which are incorporated herein in their entirety by reference.

FIELD OF THE INVENTION

The present invention relates to a system for a payment transaction, and more particularly, to a system for a payment transaction initiated by a customer using the customer's mobile device having a digital wallet, which may be activated by a multi-function device card. The digital wallet communicates with a multi-payment gateway to request payment authorization through one or more payment methods, and the multi-payment gateway communicates with one or more customer accounts associated with the one or more payment methods to process the payment transaction. The payment methods may include a credit card, a debit card, a cryptocurrency, a loyalty points program, or the like.

BACKGROUND OF THE INVENTION

Payment cards (hereinafter "cards" or "card") are widely used by millions of people around the world to facilitate payments by electronic funds transfers. Payment cards may be a credit card, debit card, point card, multi-function device (MFD) card, near field communication (NFC) card, and so forth. A consumer may make a payment using his card to purchase a product or service from a merchant. In a typical case of purchase at a merchant's physical location as shown in FIGS. 1 and 2, the customer has to present his card at a point of sale (POS) terminal located at the merchant's place of business. The card is inserted or swiped through the POS terminal. Alternatively, the required card information may be entered or the POS terminal accepts near field communication contactless transactions and the card information is saved in the POS terminal. Once the card information is received and saved, the POS terminal transmits it to the acquirer for approval of the transaction along with the merchant information, such as a merchant code, and the transaction information, such as the payment amount and currency. The POS terminal transmits such information to the acquirer through the wired or wireless Internet or the standard telephone line. The acquirer communicates with the issuer as part of the approval process, where the issuer is the entity that issued the card to the consumer.

Here, an acquirer is usually a business entity such as a bank that has a pre-existing business relationship with a merchant. An issuer is usually a business entity such as a bank that issues a card to a consumer. The approval of the payment transaction or clearance and settlement thereof may involve communication between the acquirer and the issuer. The acquirer and/or issuer either approves or denies the payment transaction, and transfers such decision back to the POS terminal.

However, a customer's card information is transferred to a merchant's POS terminal and thus, there is a risk of the customer's card information being stolen. Additionally, if the merchant does not have a POS terminal or the POS terminal does not work, the customer cannot make a payment using his card.

Mobile devices such as a cellular phones, mobile phones, smart phones, tablet computing devices, personal digital assistants (PDAs), or the like, are becoming popular and being widely used as payment devices. The mobile device typically permits a device owner to make a payment for a merchant's goods or services. The mobile device may be linked to the device owner's payment account or the device owner's card information may be stored in the mobile device.

However, if the mobile device is stolen, the user of the mobile device may have access to the device owner's payment account or card information and be able to make payments without the device owner's approval.

A number of new payment systems have been introduced. Such systems typically utilize servers or management systems to manage the new payment transaction processes and databases. However, most systems drastically change existing payment transaction systems which makes it very expensive to implement and not practical.

Additionally, such systems do not provide a practical solution to customers and merchants desiring multiple methods of payment. For example, in recent years, cryptocurrency, in various forms such as Bitcoin, has emerged as a medium of exchange that provides a cryptographically secured decentralized alternative to traditional currencies and centralized electronic money. Cryptocurrency offers flexibility and privacy protection to users and may be implemented across a network of computing devices that maintains a digital ledger in the form of a block chain. Financial transactions using cryptocurrency may occur between a cryptocurrency wallet of a sender and a cryptocurrency wallet of a receiver. Such cryptocurrency wallets may store private and public keys that are necessary to authorize transfer of cryptocurrency.

Conventional payment systems and the new payment systems discussed above do not adequately provide for payment transactions using multiple payment methods such as cryptocurrency. Further, these systems do not provide for practical and easy-to-implement means for a customer to initiate payment and choose one or more forms of payment such as cryptocurrency, centralized currency, loyalty points, and the like.

Therefore, in order to overcome these disadvantages and shortcomings, there is a need for a system and method for a customer initiated payment transaction using a customer's mobile device that allows for multiple payment options to a customer. This invention is directed to address the above problems and satisfy a long-felt need.

SUMMARY OF THE INVENTION

The present invention contrives to solve the disadvantages and shortcomings of the prior art by providing a system and method for customer initiated payment transactions using a customer's mobile device and card.

The object of the invention is to provide a system for a customer initiated payment transaction, which includes a mobile device of a customer, a card of the customer having card information, and a merchant having merchant information and payment information. The card may be a credit card, debit card, point card, multi-function device (MFD) card, near field communication (NFC) card, and so forth, and the card information may include a card number, an expiration date, an EMV parameter, a card name, user information, card verification value, password, etc. The merchant information may include a merchant code assigned to the merchant for card transactions with an acquirer, POS terminal parameter, etc., and the payment information may include the payment amount for goods or services provided to the customer, currency, transaction identification, etc.

The mobile device is operative to process a card payment transaction by the steps of, the mobile device: receiving the merchant information and the payment information; being activated, for processing the card payment transaction, by the card; creating a payment authorization request using the card information, the merchant information, and the payment information, and sending the payment authorization request to an acquirer; and receiving a result of the payment authorization request from the acquirer.

Preferably, the card is a multi-function device (MFD) card or a near field communication (NFC) card having an antenna for near field communication (NFC), and the mobile device includes an NFC sensor. The mobile device is activated for processing the card payment transaction via NFC between the card and the mobile device, and the mobile device receives the card information from the card via NFC between the card and the mobile device.

The card number or the card information is not stored in the mobile device before the step of the mobile device being activated. Furthermore, the steps also include the mobile device deleting the card number or the card information after sending the payment authorization request to the acquirer.

The mobile device receives the merchant information or the payment information by: wireless communication from the merchant; tapping the mobile device to an NFC tag of the merchant which stores the merchant information; or typing the merchant information to the mobile device. The merchant may generate and transmit to the mobile device quick response (QR) code or bar code for the merchant information or the payment information.

Alternatively, the system may utilize a server having a database which stores the merchant information. The mobile device may obtain geolocation data of the merchant using a global positioning sensor of the mobile device and sends the geolocation data to the server, and in response, the server may search for and retrieve the merchant information corresponding to the geolocation data and send the merchant information to the mobile device.

Another object of the invention is to provide a system for a customer initiated payment transaction where the customer makes a payment by his integrated loyalty points. The system includes a mobile device of a customer, a card of the customer having information on integrated loyalty points; and a merchant who subscribes to accept integrated loyalty points as a payment method. The information on the integrated loyalty points includes customer identification and the amount of the integrated loyalty points owned by the customer.

The mobile device is operative to process a payment transaction using the integrated loyalty points of the customer by the steps of, the mobile device: receiving the merchant information and the payment information; being activated, for processing the payment transaction, by the card; creating a payment authorization request using the information on the integrated loyalty points, the merchant information, and the payment information, and sending the payment authorization request to an acquirer for the integrated loyalty points; and receiving a result of the payment authorization request from the acquirer.

Preferably, the information on the integrated loyalty points is not stored in the mobile device before the step of the mobile device being activated. In addition, the steps further include the mobile device deleting the information on the integrated loyalty points after sending the payment authorization request to the acquirer.

Still another object of the invention is to provide a method for a customer initiated payment transaction using the customer's card. The method includes the steps of the customer's mobile device: receiving the merchant information and the payment information; being activated, for processing a card payment transaction, by the customer's card; creating a payment authorization request using card information, the merchant information, and the payment information, and sending the payment authorization request to an acquirer; and receiving a result of the payment authorization request from the acquirer. The method further includes the step of the mobile device deleting the card information after sending the payment authorization request to the acquirer.

Still another object of the invention is to provide a method for a customer initiated payment transaction using the customer's integrated loyalty points which are stored in the customer's card. The method includes the steps of the customer's mobile device: receiving the merchant information and the payment information; being activated, for processing the payment transaction, by the card; creating a payment authorization request using the information on the integrated loyalty points, the merchant information, and the payment information, and sending the payment authorization request to an acquirer for the integrated loyalty points; and receiving a result of the payment authorization request from the acquirer. The method further includes the step of the mobile device deleting the information on the integrated loyalty points after sending the payment authorization request to the acquirer.

Still another object of the present invention is to provide a customer initiated payment transaction system including: a mobile device of a customer, a merchant, a multi-payment gateway, and a network. The mobile device includes a digital wallet, which may also be a cryptocurrency wallet. The merchant includes merchant information and payment information. In such a system, a customer intitaed payment transaction includes the steps of: the customer launching the digital wallet on the mobile device; the digital wallet receiving the merchant information and payment information; the digital wallet receiving a payment method selection for payment; the digital wallet generating a payment authorization request based on the merchant information and the payment method selection; the digital wallet sending the payment authorization request to the multi-payment gateway; the multi-payment gateway communicating to the merchant a result of a payment transaction; and the digital wallet receiving a result of the payment authorization request from the multi-payment gateway.

Still another object of the present invention is to provide a customer initiated payment transaction system including: a mobile device of a customer, a merchant, a multi-payment gateway, and a network wherein the mobile device includes a digital wallet, which may also be a cryptocurrency wallet, wherein the merchant includes merchant information and payment information, wherein a customer intitaed payment transaction includes the steps of: the customer launching the digital wallet on the mobile device; the digital wallet receiving the merchant information and payment information; the digital wallet receiving a payment method selection for payment; the digital wallet generating a payment authorization request based on the merchant information and the payment method selection; the digital wallet sending the payment authorization request to the multi-payment gateway; the multi-payment gateway requesting a payment from an acquirer; and the merchant receiving a result of the payment authorization request from the acquirer. The merchant may have a NFC tag and the digital wallet of the customer may communicate with the merchant via NFC. Alternatively, or additionally, the merchant may include a quick reading (QR) tag and the digital wallet of the customer may communicate with the merchant via a QR code scan.

In one or more embodiments of the invention, the customer initiated payment system includes a MFD card and the payment method selection is an account stored on the card. According to such embodiments, the MFD card may activate the digital wallet as described above and in more detail below.

In one or more embodiments of the invention, the customer initiated payment method selection is a cryptocurrency. Preferably, the digital wallet stores private and public authentication keys to enable financial transactions using the cryptocurrency.

In one or more embodiments of the invention, the payment method selection is an account for an integrated loyalty points program.

In one or more embodiments of the invention, the payment method selection is a plurality of payment methods. For example, the payment method selection may be payment according to a predetermined amount of a cryptocurrency and a predetermined amount of integrated loyalty points. When a plurality of payment methods is selected, the digital wallet receives multi-payment information including an amount to be deducted from each of the plurality of payment methods and the multi-payment gateway receives the multi-payment information from the digital wallet.

Another object of the present invention is to provide a method of canceling the customer initiated payment transaction. Such a cancellation includes the steps of: the customer launching the digital wallet on the mobile device; the digital wallet requesting to the multi-payment gateway a status inquiry of the customer initiated payment transaction; the digital wallet requesting to the multi-payment gateway the cancellation of the customer initiated payment transaction; the multi-payment gateway receiving an authorization of the cancellation of the customer initiated payment transaction from the merchant; and the digital wallet receiving from the multi-payment gateway the authorization of the cancellation; the digital wallet displaying a confirmation notification of the cancellation of the customer initiated payment transaction on the mobile device; and the multi-payment gateway sending a message to the merchant of the cancellation.

According to one or more embodiments of the invention, the merchant further includes a merchant mobile device including a merchant digital wallet, wherein the digital wallet of the customer receives merchant information and payment information from the merchant digital wallet and the multi-payment gateway communicates with the merchant digital wallet results of the payment transaction.

Another object of the present invention is to provide a payment transaction system including: a mobile device of a customer, the mobile device comprising a digital wallet; a merchant comprising a merchant point-of-sale device, merchant information, and payment information; a multi-payment gateway; and a network. The payment transaction may include the steps of: the merchant point-of-sale device receiving payment information; the digital wallet sending to the merchant point-of-sale device customer identification; the multi-payment gateway receiving from the merchant point-of-sale device the merchant information and the payment information; the digital wallet receiving the merchant information and the payment information from the multi-payment gateway; and the digital wallet receiving a payment method selection for payment from the customer. Here, the step of the digital wallet sending customer identification may include: the digital wallet communicating with the merchant point-of-sale device via one of: NFC, the digital wallet including a NFC tag and the merchant further including a NFC sensor; and QR code scanning, the digital wallet including a QR tag and the merchant further including a QR scanner.

In one or more embodiments, the payment transaction includes a MFD card, wherein the payment method selection is an account stored on the card, wherein the payment transaction further includes the step of the MFD card activating digital wallet for processing the customer-initiated payment transaction, wherein the account stored on the MFD card is one of a credit card, a debit card, a prepaid cash card, or a loyalty points program card, wherein the account stored on the MFD card is a plurality of accounts and each account is one of a credit card, a debit card, a prepaid casn card, or a loyalty points program card. The MFD card may include an NFC antenna and the mobile device may include an NFC sensor. The digital wallet may be activated for processing the custom-initiated payment transaction via NFC between the MFD card and the mobile device, wherein the mobile device may receive MFD card information from the MFD card via NFC between the card and the mobile device. Activating digital wallet by the MFD card may include transferring a chip serial number or a card serial number of the card from the card to the mobile device. The mobile device may be activated for processing the card payment transaction if the transferred chip serial number or the transferred card serial number matches the chip serial number or the card serial number stored in the mobile device.

According to one or more embodiments of the invention, the payment method selection may be a cryptocurrency and the merchant information includes a merchant public key.

According to one or more embodiments, the payment method selection is a cryptocurrency and the payment transaction includes the steps of: the multi-payment gateway requesting to a cryptocurrency exchange an exchange of the customer's cryptocurrency to a currency accepted by the merchant; and the merchant receiving the exchanged currency.

Another object of the invention is to provide a payment transaction system, wherein the payment method selection is an account for an integrated loyalty points system.

Another object of the invention is to provide a payment transaction system including a plurality of payment methods and the customer-initiated payment transaction further comprises the steps of: the digital wallet receiving multi-payment information including an amount to be deducted from each of the plurality of payment methods; and the multi-payment gateway receiving the multi-payment information from the digital wallet.

In one or more embodiments of the payment transaction system, a cancellation of the payment transaction includes the steps of: the customer launching the digital wallet on the mobile device; the digital wallet requesting to the multi-payment gateway a status inquiry of the customer-initiated payment transaction; the digital wallet requesting to the multi-payment gateway the cancellation of the customer-initiated payment transaction; the multi-payment gateway receiving an authorization of the cancellation of the customer-initiated payment transaction from the merchant; and the digital wallet receiving from the multi-payment gateway the authorization of the cancellation; the digital wallet displaying a confirmation notification of the cancellation of the customer-initiated payment transaction on the mobile device; and the multi-payment gateway sending a message to the merchant of the cancellation.

The advantages of the present invention are: (1) a customer's payment transaction is possible even with the merchant's POS terminal or when the POS terminal does not work; (2) sensitive customer's card information does not have to be transmitted to a merchant; (3) both customer's mobile device and card are necessary for a payment transaction, and the mobile device does not store the card information, resulting in increased security; (4) merchants do not have to pay expensive card processing fees and the payment process becomes simplified; (5) the system of the present invention can get rid of the necessity of merchant POS terminals; (6) various cards such as debit/credit cards or loyalty point cards can be used as a payment method; (7) the system of the present invention utilizes pre-existing systems and does not drastically change such pre-existing systems, and thus it is easy to implement, effective, and cost-saving; (8) the system of the present invention minimizes the impact to the existing payment processes and infrastructures such as the Europay (Trademark), Mastercard (Trademark) and Visa (Trademark; collectively EMV) standard; (9) a customer's mobile device plays the role of the merchant's POS terminal and thus, the customer's card information does not have to be disclosed to the merchant; (10) under the system of the present invention, security has been improved because the customer needs his card and mobile device to make a card payment and the mobile device does not store the card information except when it processes a payment request; (11) the system of the present invention provides even more improved security when the card is an MDF or NFC card and activated by the mobile device because even if the card is lost or stolen, it cannot be used unless activated by the mobile device; (12) the system of the present invention provides a multi-payment gateway, which facilitates payment by the customer to the merchant; (13) the system with the multi-payment gateway provides an easy-to-implement system that allows multiple payment options to the customer and merchant, including credit cards, debit cards, cryptocurrency, loyalty points, and the like; and (14) the system may be implemented to provide a variety of shopping venues including online (PC and mobile) and offline merchants.

Although the present invention is briefly summarized, the fuller understanding of the invention can be obtained by the following drawings, detailed description, and appended claims.

BRIEF DESCRIPTION OF THE DRAWINGS

These and other features, aspects, and advantages of the present invention will become better understood with reference to the accompanying drawings, wherein:

FIG. 19 shows a process for a purchase on a mobile shopping platform according to the present invention;

FIG. 20 shows a process for a cancellation of a payment transaction from a mobile shopping platform according to the present invention;

FIG. 21 shows a process for an offline payment authorization using a mobile phone according to the present invention;

FIG. 25 is an image showing an exemplary screen for viewing an account transaction history according to the present invention;

DETAILED DESCRIPTION OF THE EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations by use of the word "about", it will be understood that the particular value forms another embodiment.

Figure 1:
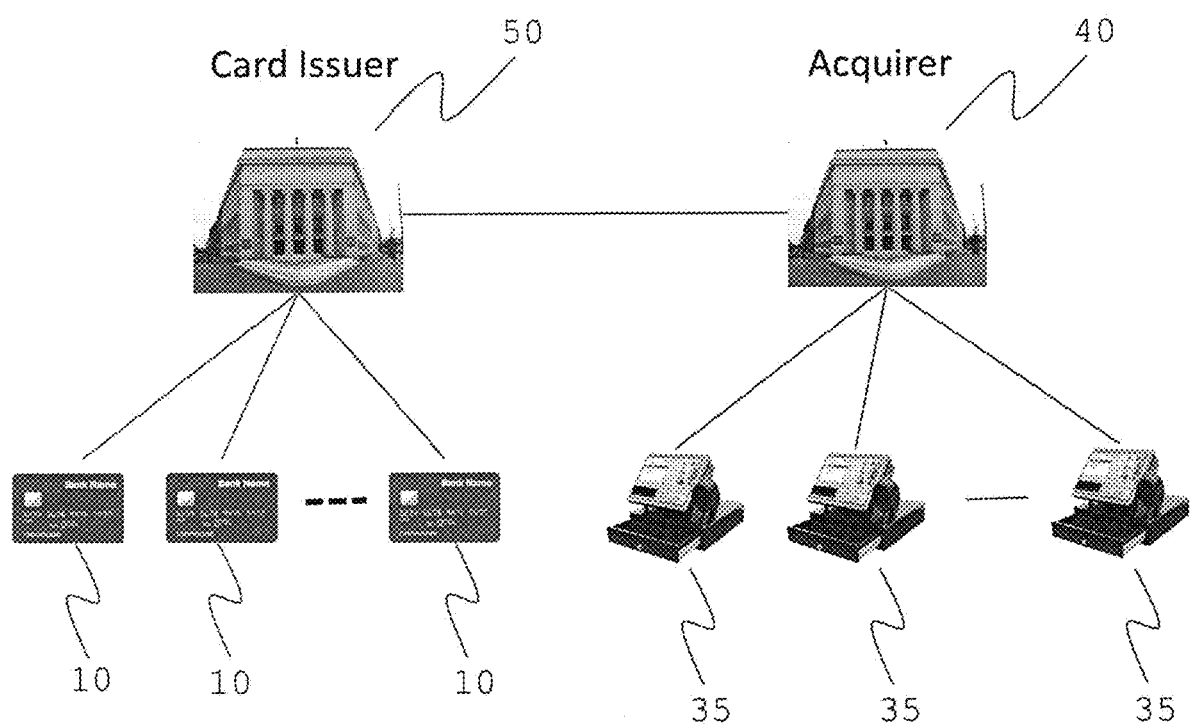
FIG. 1 is a schematic illustration of a conventional card payment transaction.
Figure 2:
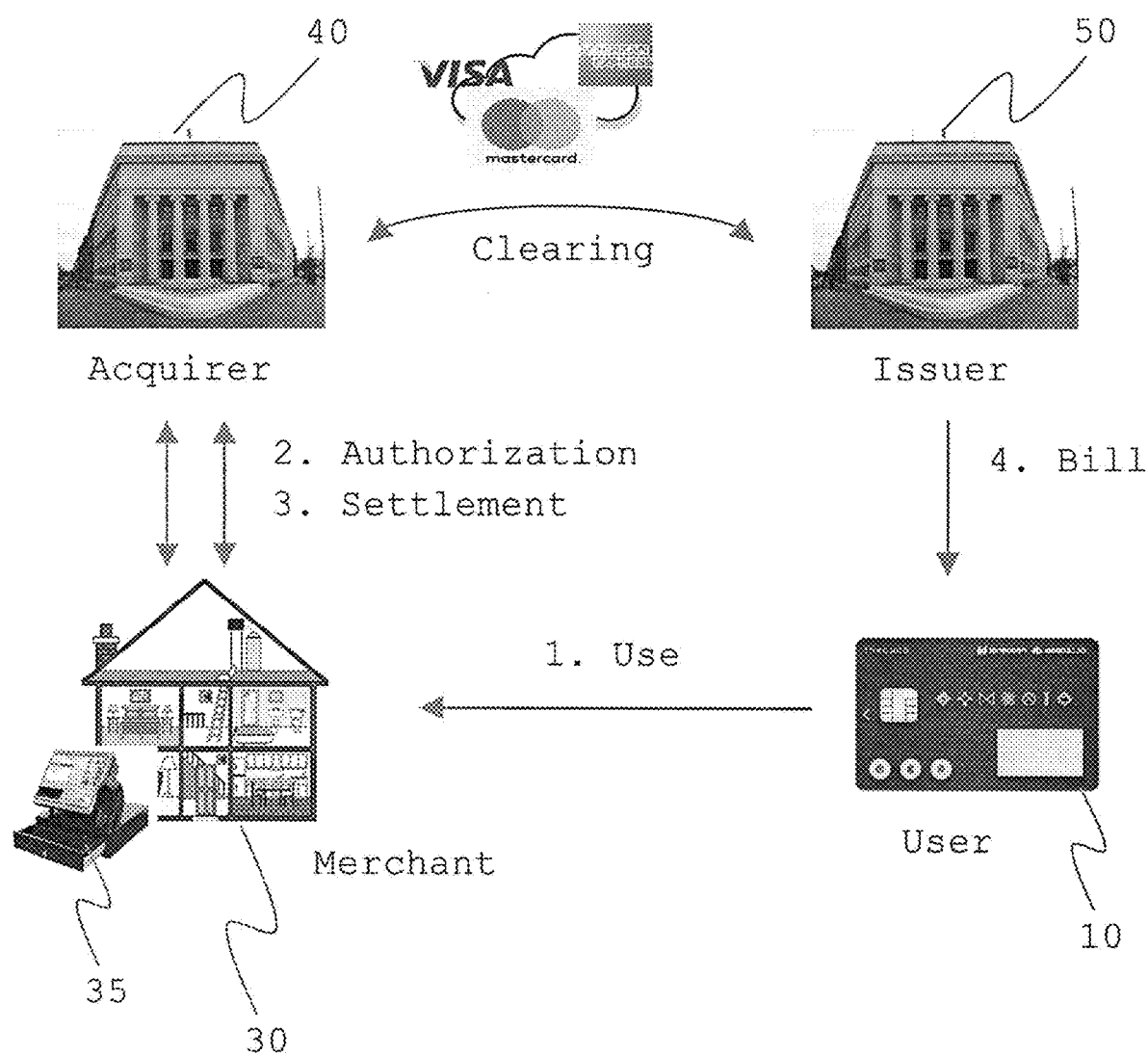
FIG. 2 is another schematic illustration of a conventional card payment transaction.

FIGS. 1 and 2 illustrate a conventional payment system using a merchant's point of sale (POS) terminal 35 and a customer's card 10 such as a credit/debit card, a point card, a loyalty point card, a multi-function device (MFD) card, a near field communication (NFC) card, digital card, dual interface card or radio frequency (RF) card, or the likes.

A consumer may make a payment using his card 10 to purchase a product or service from a merchant. The customer presents his card 10 at a point of sale (POS) terminal 35 located at a merchant's place of business 30. The card 10 is inserted or swiped through the POS terminal 35. Alternatively, the required card information may be entered or the POS terminal 35 may accept near field communication contactless transactions from the card 10. The card information is then saved in the POS terminal. Once the card information is received and saved, the POS terminal 35 transmits it to the acquirer 40 for approval of the transaction along with the merchant information, such as a merchant code, and the transaction information, such as the payment amount and currency. The merchant code is an identification assigned to the merchant for card transaction. The POS terminal 35 transmits such information to the acquirer 40 through the wired or wireless Internet or the standard telephone line. The acquirer 40 communicates with the issuer 50 as part of the approval process, where the issuer 50 is the entity that issued the card 10 to the consumer.

Here, an acquirer 40 is usually a business entity such as a commercial bank that has a pre-existing business relationship with a merchant and an issuer 50 is usually a business entity such as a bank that issues a card 10 to a consumer. The approval of the payment transaction or clearance and settlement thereof may involve communication between the acquirer 40 and the issuer 50. The acquirer and/or issuer either approves or denies the payment transaction, and transfers such decision back to the POS terminal 35.

Figure 3:
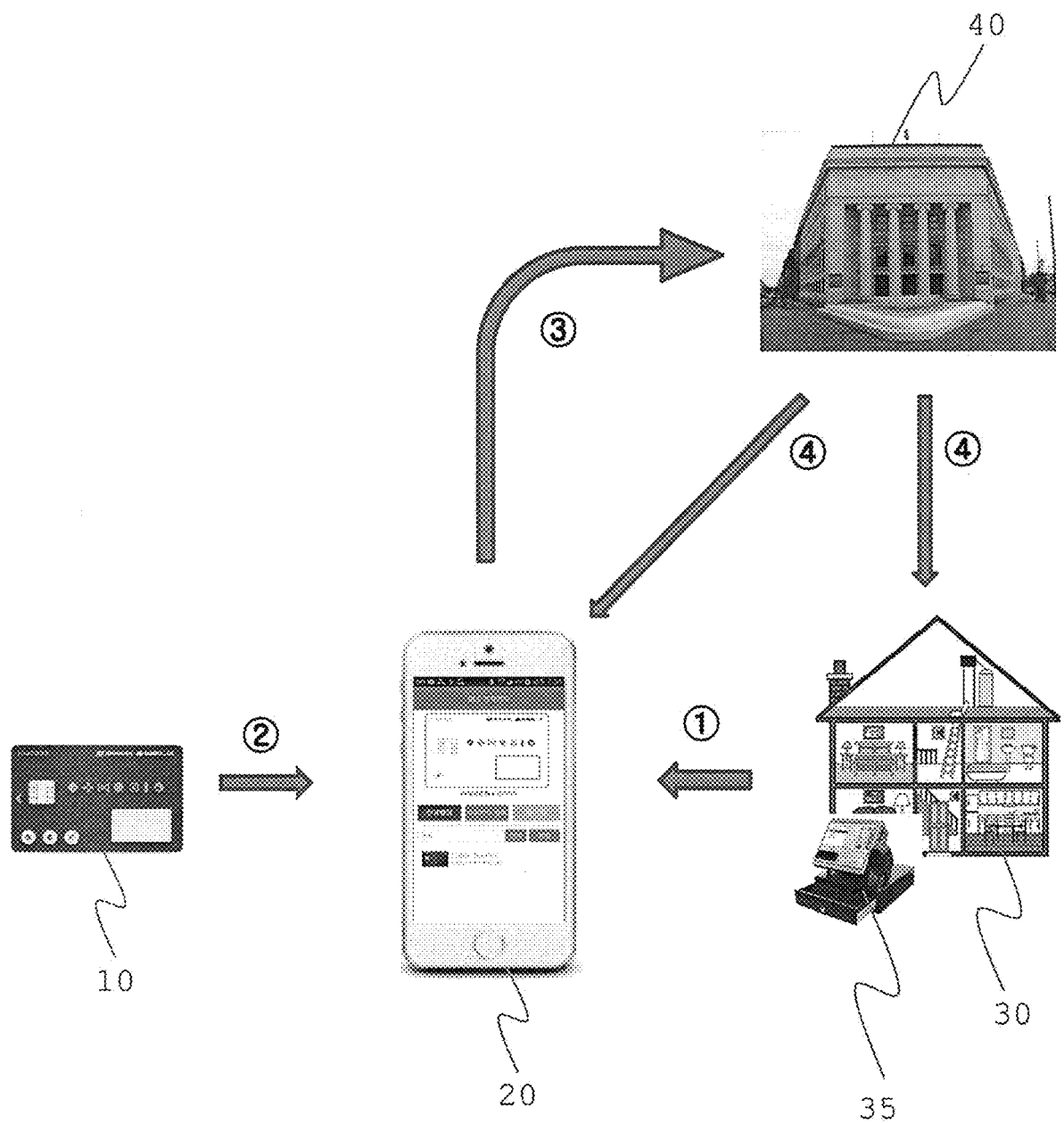
FIG. 3 is a schematic illustration of a card payment transaction using customer's mobile device and card according to the present invention.
Figure 4:
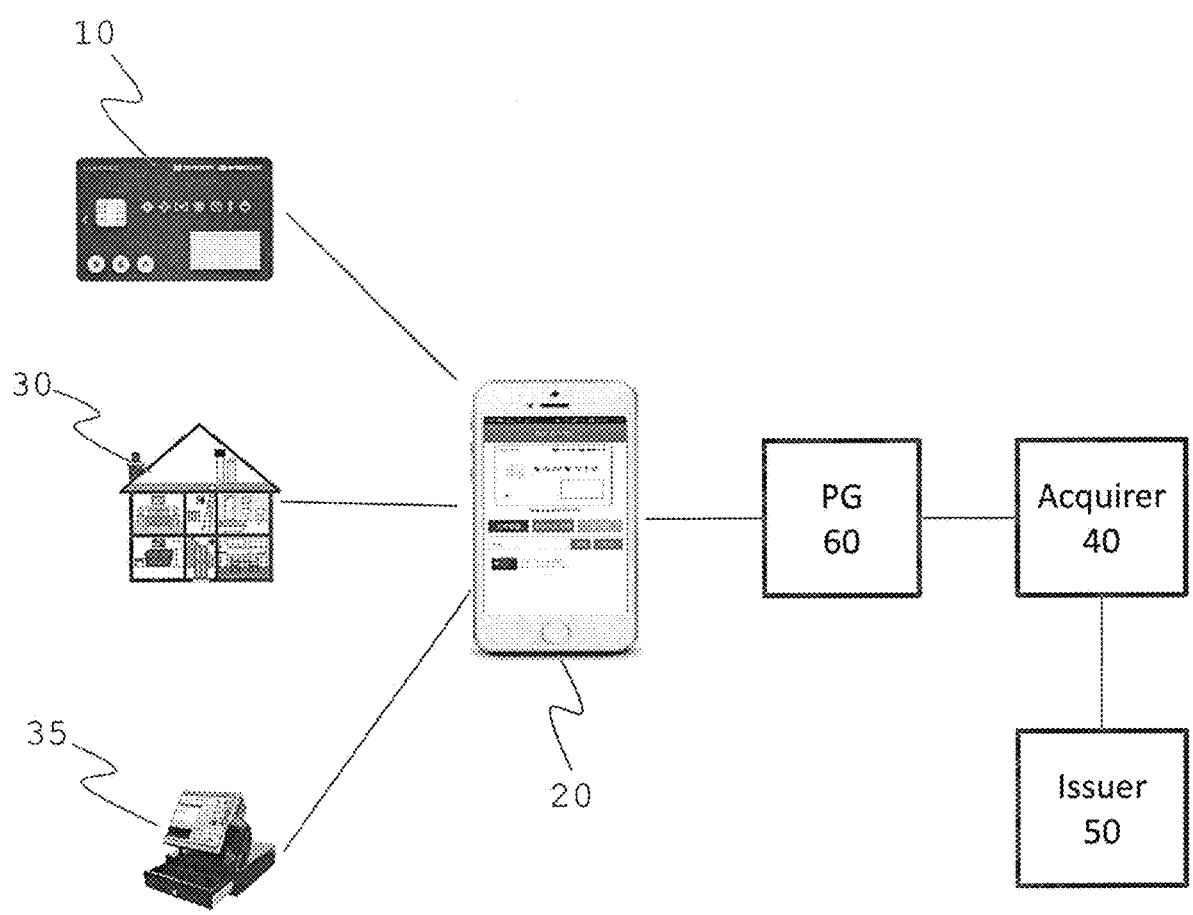
FIG. 4 is another schematic illustration of the card payment transaction using customer's mobile device and card according to the present invention.
Figure 5:
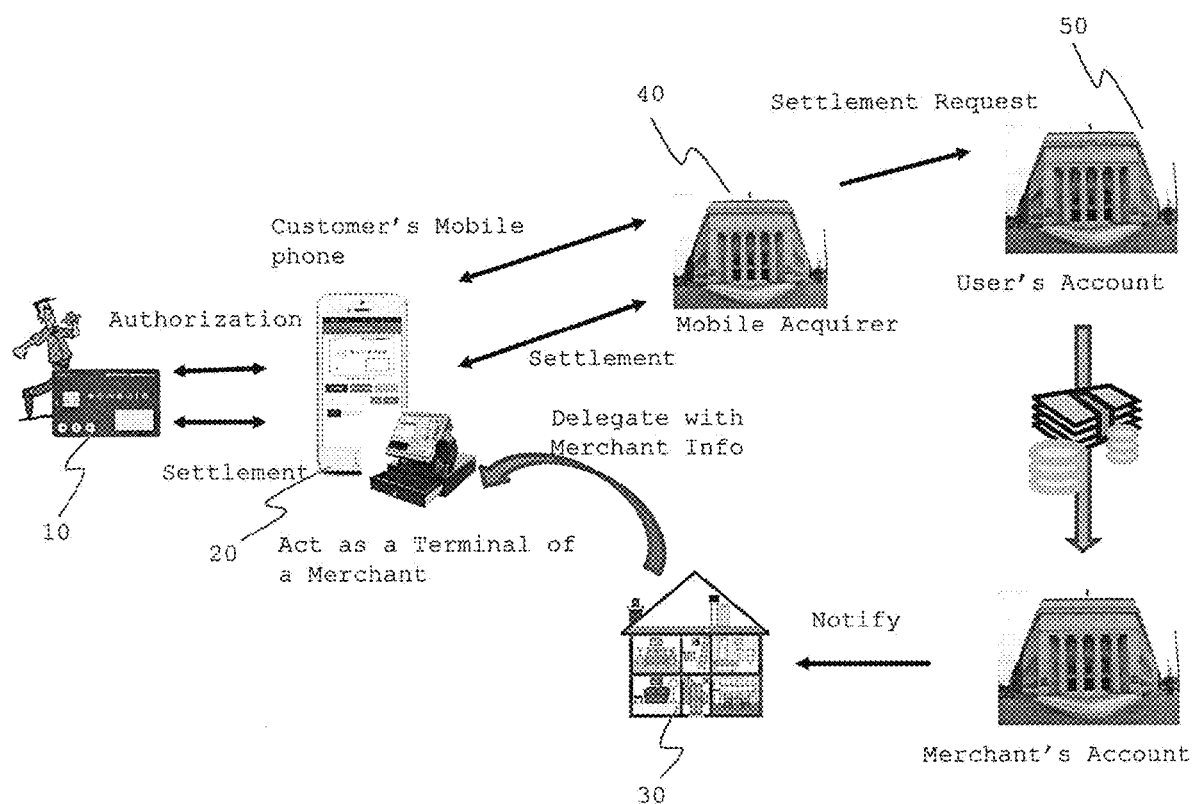
FIG. 5 is still another schematic illustration of the card payment transaction using customer's mobile device and card according to the present invention.

FIGS. 3, 4 and 5 illustrate the system for a customer initiated payment system using customer's card 10 and mobile device 20 according to the present invention.

The system for a customer initiated payment transaction includes a mobile device 20 of a customer; a card 10 of the customer having card information; and a merchant having merchant information and payment information. The merchant information may include a merchant code and the merchant's POS or other terminal parameter, and the payment information includes a payment amount, currency, or transaction number that the customer has to pay to purchase goods or services of the merchant.

The mobile device 10 may be a cellular phone, mobile phone, smart phone, tablet computing device, personal digital assistant (PDA), or the like. Here, the mobile device 10 also includes the application installed therein to implement the system of the present invention.

The acquirer 40 communicates with the issuer 60 as part of the approval process, where the issuer 60 is the entity that issued the card 10 to the consumer. Here, an acquirer 40 is usually a business entity such as a commercial bank that has a pre-existing business relationship with a merchant and an issuer 60 is usually a business entity such as a bank that issues a card 10 to a consumer. The approval of the payment transaction or clearance and settlement thereof may involve communication between the acquirer 40 and the issuer 60. The acquirer 40 and/or issuer 60 either approves or denies the payment transaction, and transfers such decision back to the mobile device 20. As in FIG. 4, the system may further include a payment gateway 60.

The mobile device 20 is operative to process a card payment transaction by the steps of, the mobile device 20: receiving the merchant information and the payment information; being activated, for processing the card payment transaction, by the card 10; creating a payment authorization request using the card information, the merchant information, and the payment information, and sending the payment authorization request to an acquirer 40; and receiving a result of the payment authorization request from the acquirer 40.

Here, the step of the mobile device 20 being activated includes not just activation for processing the card payment transaction but also authorization to use the card by the mobile device. Such activation, including authorization, may be accomplished in different ways: NFC or Bluetooth (Trademark) communication between the card and the mobile device, typing the card information into the mobile device 20, etc. Such activation may additionally include typing password or matching finger print or the likes.

Additionally, the step of the mobile device 20 being activated may be performed before the step of the mobile device 20 receiving the merchant information and the payment information.

The result of the payment authorization request may be approval or denial of the card payment, and such result is transmitted and displayed on the mobile device.

Figure 6:
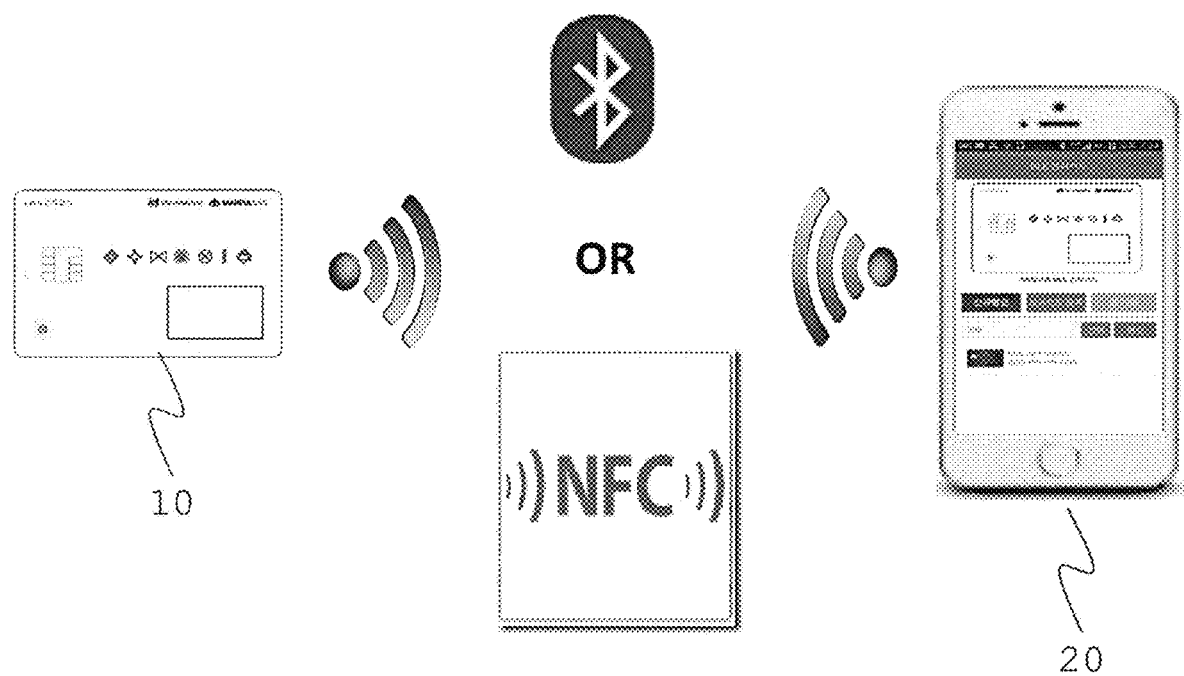
FIG. 6 shows communication methods between a card and a mobile device for a card payment transaction according to the present invention.

FIG. 6 shows the communication between the customer's card 10 and the customer's mobile device 20. Such communication is preferably by Bluetooth (Trademark) or near field communication. Or, the card information may be typed in the mobile device 20.

Preferably, the card 10 may be a multi-function device (MFD) card or a near field communication (NFC) card having an antenna for near field communication (NFC), and the mobile device 20 may include an NFC sensor. The NFC card may have dual interface or may be a contactless card. The mobile device 20 may be activated for processing the card payment transaction via NFC between the card 10 and the mobile device 20, and the mobile device 20 may receive the card information from the card 10 via NFC between the card and the mobile device. In other words, by tapping the card 10 to the mobile device 20, the mobile device 20 is activated for processing a card payment transaction and receives the card information.

The card 10 may be the MFD card which stores information on a plurality of different cards, and the customer may select a card to be used for the card payment transaction from the list of the plurality of different cards using the MFD card. Alternatively, the card 10 may be the MFD card which stores information on a plurality of different cards, and the customer may select a card to be used for the card payment transaction from a list of the plurality of different cards using the mobile device. In other words, an MFD card can store a number of debit/credit cards and/or point cards together and a user can select which card to be used as a payment means. The MFD card may have a display such that the user can select a card from the list of cards displayed on the MFD card. Alternatively, such list may be transferred to the mobile device 20 and displayed on the screen of the mobile device 20 so that the user can select a card from the list.

The steps may further include the step of activating the card 10 such as the MFD card or NFC card via NFC or Bluetooth Light Energy (BLE) communication between the mobile device 20 and the card 10. For the BLE communication, the card 10 may have a BLE chip and the mobile device 20 may have a BLE antenna. Upon activation, the card can be used for payment transactions. U.S. patent application Ser. No. 15/605,808, entitled "Method for Activating Multi-Function Device Card", discloses method for activating the MFD card using the mobile device, the disclosure of which is incorporated herein in its entirety by reference.

The step of activating the card 10 may be performed before the step of the mobile device 20 receiving the merchant information and the payment information.

The method for activating an MFD card 10 by a mobile device 20 includes: switching on an NFC chip of the mobile device 20 to enable the mobile device 20 to wirelessly connect to the MFD card 10 via an NFC network; searching with the mobile device 20 in the NFC network for the MFD card 10 within a communicable range of the mobile device 20 by transmitting NFC signal from the mobile device 20 to the MFD card 10 to enable electromagnetic induction in an NFC antenna of the MFD card 10; launching on the mobile device 20 a preloaded application for initiating MFD card activation if the MFD card 10 is discovered via the NFC network; connecting the mobile device 20 to the MFD card 10 by a wireless personal area network (WPAN) using a WPAN antenna and WPAN chip of the MFD card 10 upon launching the preloaded application for initiating MFD card activation on the mobile device 20; mutually authenticating the MFD card 10 and the mobile device 20 through the WPAN by a predetermined method by the application; and when the MFD card 10 is authenticated, completing activation of the MFD card 10 for use. Preferably, the WPAN connection is a Bluetooth Low Energy (BLE) connection enabled by a BLE antenna and a BLE chip of the MFD card 10 and corresponding BLE antenna and BLE chip of the mobile device 20. Since the card 10 is activated by the mobile device 20, even if it is lost, it cannot be used for payment transactions without the mobile device 20.

The step of the mobile device 20 being activated includes transferring a chip serial number or a card serial number of the card 10 from the card 10 to the mobile device 20, and the mobile device 20 is activated for processing the card payment transaction if or only if the transferred chip serial number or the transferred card serial number matches the chip serial number or the card serial number stored in the mobile device 20.

The steps may further include a step of the mobile device receiving the card information. The card information may be received via NFC or Bluetooth communication or typed into the mobile device 20.

For security reasons, the card number or the card information is not stored in the mobile device 20 before the step of the mobile device 20 being activated. Furthermore, the steps further include the step of the mobile device 20 deleting the card information after sending the payment authorization request to the acquirer 40.

The steps may further include the step of the mobile device 20 creating and sending a clearance and settlement request to the acquirer 40. In other words, the mobile device 20 sends two requests: the payment authorization request and the clearance and settlement request. By these two separate requests, customers can have better control over the merchant's production of the goods or services.

Figure 7:
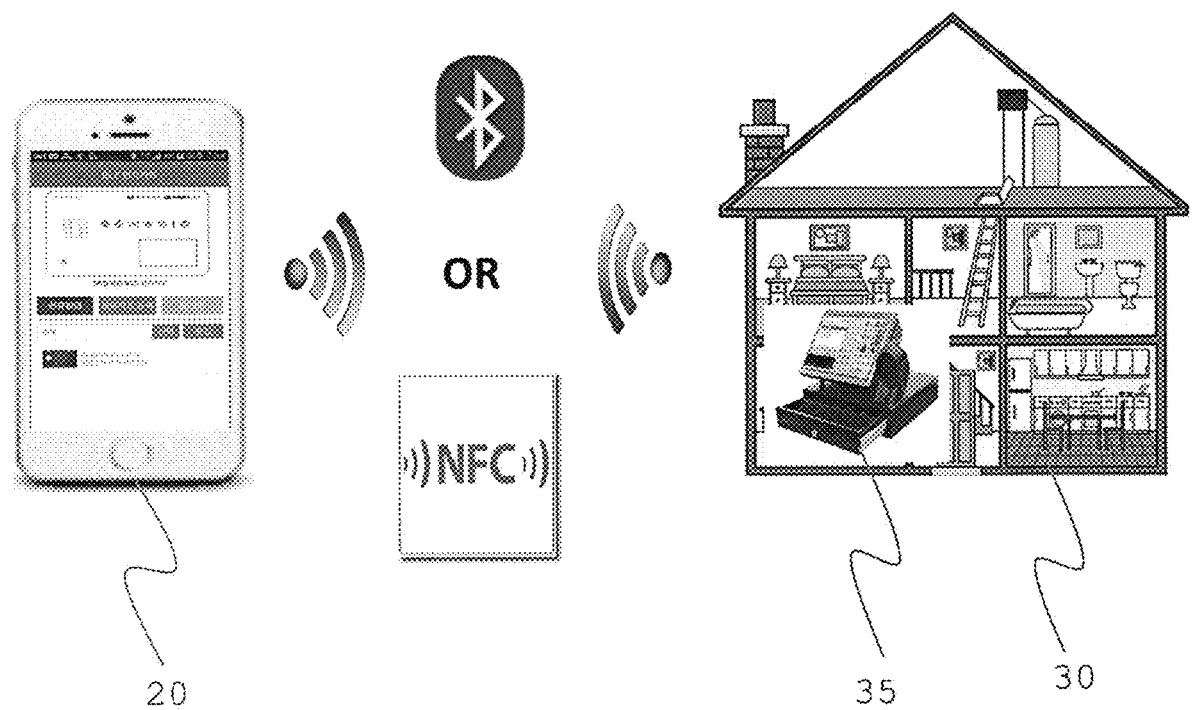
FIG. 7 shows communication methods between a card and a merchant or its POS terminal for the card payment transaction according to the present invention.

FIG. 7 illustrates the communication between the mobile device 20 and the merchant 30 or its POS terminal 35.

The mobile device 20 may receive the merchant information from the merchant by: wireless communication from the merchant; tapping the mobile device 20 to an NFC tag or RFID tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant information.

In the alternative embodiment, the system may further comprise a server having a database which stores the merchant information. The mobile device 20 may obtain geolocation data of the merchant using a global positioning sensor (GPS) of the mobile device 20 and sends the geolocation data to the server, and in response, the server searches for and retrieves the merchant information corresponding to the geolocation data and sends the merchant information back to the mobile device 20.

In one embodiment, the system may utilize a proprietary portal database to retrieve the merchant information. The customer can retrieve detailed merchant information using the proprietary system, using for example GPS location of the merchant's place of business. The database may be updated from information gathered from participant users. The mobile device 20 may send the GPS location of the merchant and receive the merchant information from the proprietary merchant information provision system, or the mobile device 20 may send the GPS location or the merchant ID to the proprietary merchant information provision system and the proprietary merchant information provision system may send the merchant information back to the mobile device 20.

Besides, the mobile device 20 may receive the payment information from the merchant by: wireless communication from the merchant; tapping the mobile device to an NFC tag or RFID tag of the merchant which stores the payment information; or typing the payment information to the mobile device 20 either by the customer or the merchant. Additionally, SMS, beacon, infrared communication may be used. Alternatively, the merchant may use QR code or bar code to store and transmit the payment information.

The steps may further include a step of the acquirer 40 sending the result of the payment authorization request to the merchant via short message service (SMS), email, push message to the merchant terminal, etc.

Figure 8:
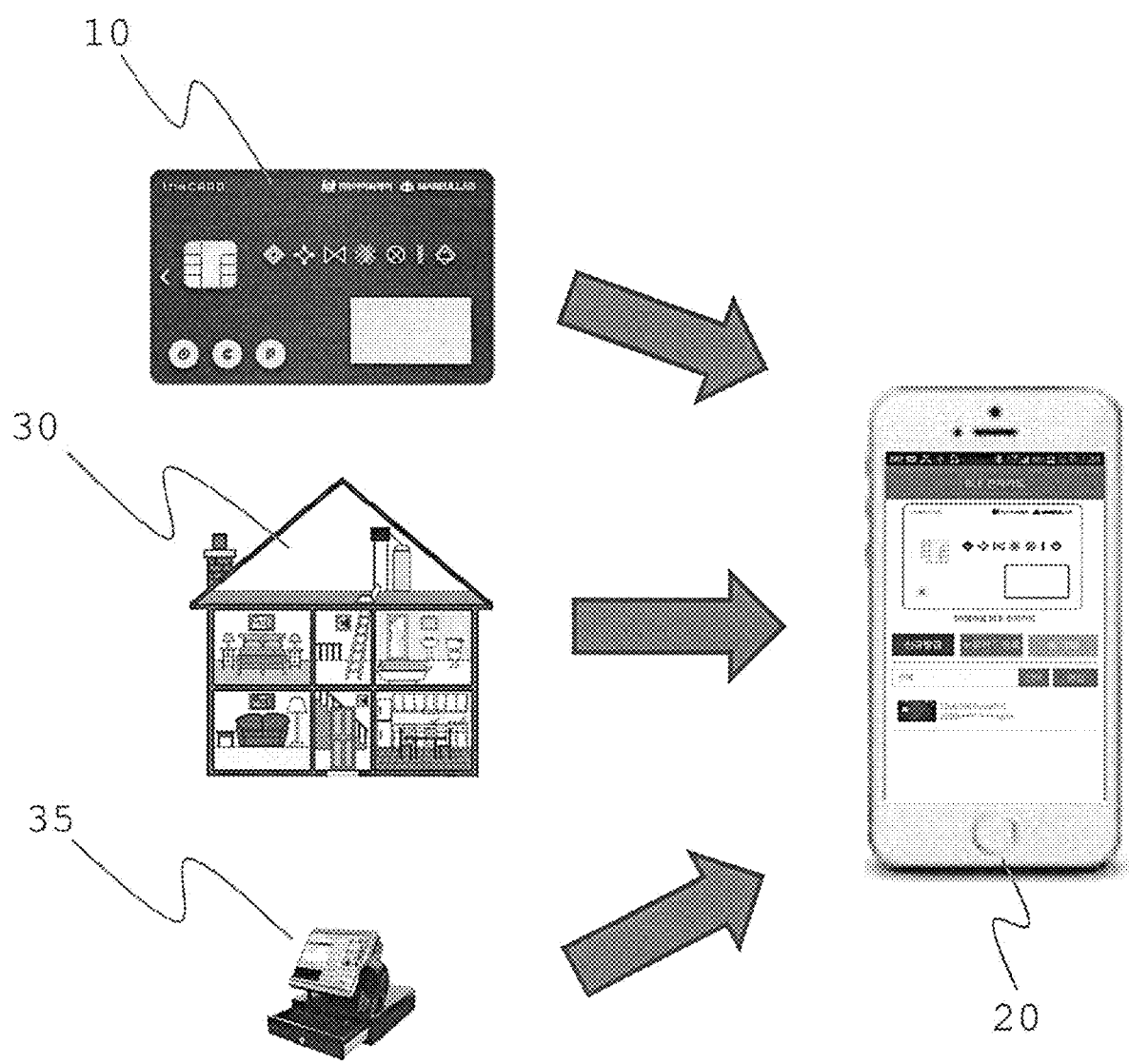
FIG. 8 shows a communication between customer's mobile device and a card, a merchant or the merchant's POS terminal according to the present invention.

As shown in FIG. 8, the mobile device 20 communicates with the card 10, the merchant 30, or the merchant's POS terminal, and plays the role of customer's own POS terminal.

FIGS. 3, 4 and 5 illustrate the system for a customer initiated payment system using customer's card 10 and mobile device 20 according to the present invention. The card 10 may be debit/credit card, but it can be point card as well. U.S. patent application Ser. No. 15/679,072, entitled "System and Method for Integrated Management of Loyalty Points", discloses a method to convert non-integrated loyalty points to integrated loyalty points, the disclosure of which is incorporated herein in its entirety by reference.

The system for a customer initiated payment transaction according to the present invention includes: a mobile device 20 of a customer; a card 10 of the customer having information on integrated loyalty points; and a merchant who subscribes to accept integrated loyalty points as a payment method. The merchant has merchant information and payment information, and the information on the integrated loyalty points includes customer identification and the amount of the integrated loyalty points owned by the customer. The merchant information includes a merchant code and the payment information includes a payment amount.

The mobile device 20 is operative to process a payment transaction using the integrated loyalty points of the customer by the steps of, the mobile device 20: receiving the merchant information and the payment information, for instance, from the merchant; being activated, for processing the payment transaction, by the card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40.

The system may further include an integrated management server for managing the integrated loyalty points.

Preferably, the card 10 may be a multi-function device (MFD) card or a near field communication (NFC) card having an antenna for near field communication (NFC), and the mobile device 20 may include an NFC sensor. The mobile device 20 may be activated for processing the payment transaction via NFC between the card 10 and the mobile device 20, and the mobile device 20 may receive the information on the integrated loyalty points from the card 10 via NFC between the card 10 and the mobile device 20.

For better security, the information on the integrated loyalty points may not be stored in the mobile device 20 before the step of the mobile device 20 being activated. In addition, the steps may further include the step of the mobile device 20 deleting the information on the integrated loyalty points after sending the payment authorization request to the acquirer 40.

The mobile device 20 may receive the merchant information and/or the payment information from the merchant by: wireless communication from the merchant; tapping the mobile device 20 to an NFC tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant or payment information.

The steps may further include a step of the acquirer 40 sending the result of the payment authorization request to the merchant via SMS, email, push message to the merchant terminal, etc.

In still another embodiment, a method for a customer initiated payment transaction using the customer's card 10 is disclosed. The method includes the steps of customer's mobile device 20: receiving the merchant information and the payment information, for instance, from the merchant; being activated, for processing a card payment transaction, by customer's card 10; creating a payment authorization request using card information, the merchant information, and the payment information, and sending the payment authorization request to an acquirer 40; and receiving a result of the payment authorization request from the acquirer 40. The method further includes the step of the mobile device deleting the card information after sending the payment authorization request to the acquirer 40.

In still another embodiment, a method for a customer initiated payment transaction using the customer's integrated loyalty points, which are stored in the customer's card 10, is disclosed. The method includes the steps of the customer's mobile device 20: receiving the merchant information and the payment information, for instance, from the merchant; being activated, for processing the payment transaction, by the customer's card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40. The method further includes the step of the mobile device 20 deleting the information on the integrated loyalty points after sending the payment authorization request to the acquirer 40.

Under the typical purchase situations using the system of the present invention, a customer enters a merchant's place of business and purchases goods or services of the merchant. The customer's mobile device 20 receives the merchant information and the payment information. The customer may activate his MFD card or NFC card 10 via BLE or NFC by tapping it to his mobile device 20, and then the customer may select one of the stored payment methods—credit/debit cards or (integrated or non-integrated loyalty) point cards—from the screen of the mobile device 20. Then, the mobile device 20 creates and sends a payment authorization request to an acquirer, and then the acquirer sends the authorization result back to the mobile device 20 and the merchant.

The system of the present invention may be additionally used for escrow situations. The customer may separate the payment process into two: sending a payment authorization request to an acquirer and sending a clearance and settlement request to an acquirer. Between the two steps, the customer can monitor and make sure whether the merchant fulfills certain requirements or obligations.

Figure 9:
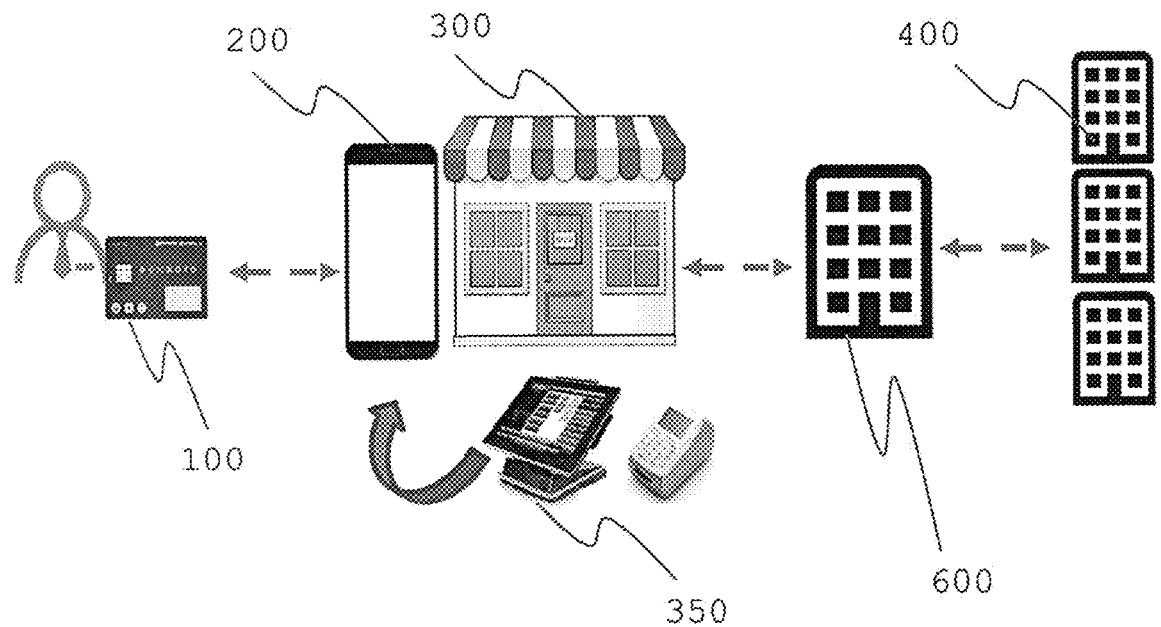
FIG. 9 shows a system for a merchant initiated payment transaction using a customer's mobile device.
Figure 10:
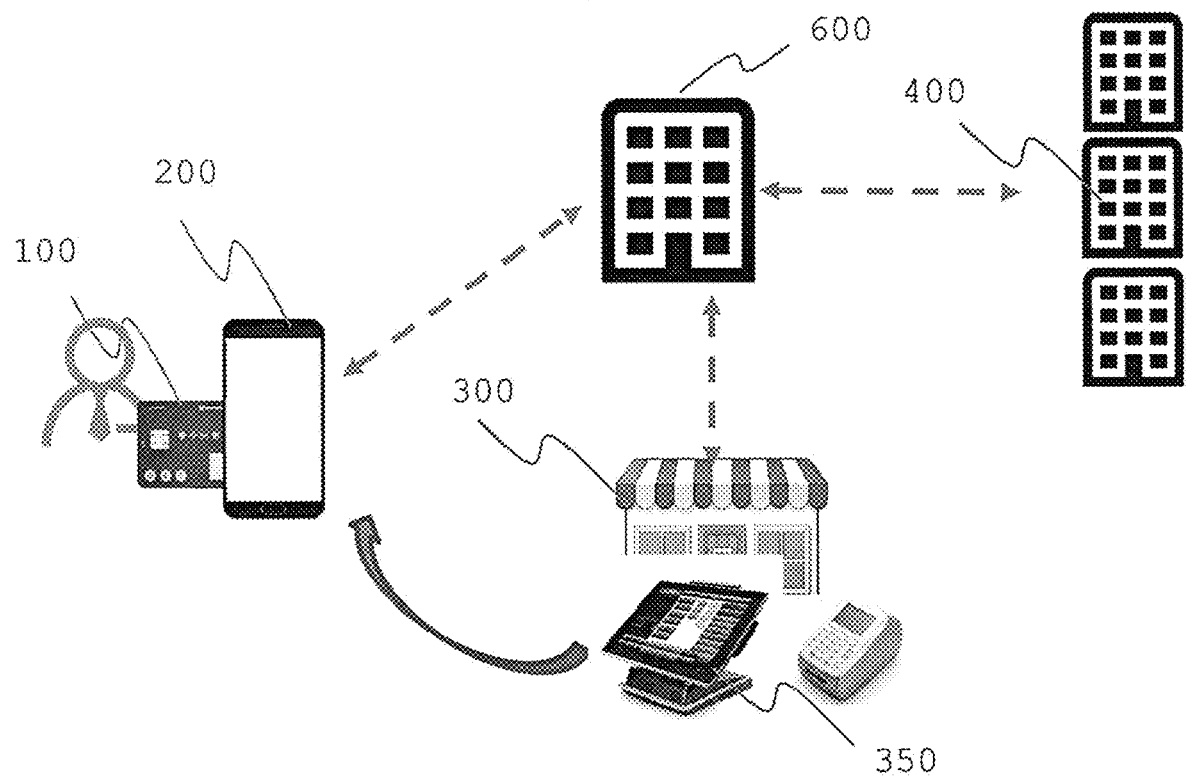
FIG. 10 shows a system for a customer initiated payment transaction according to the present invention.
Figure 11:
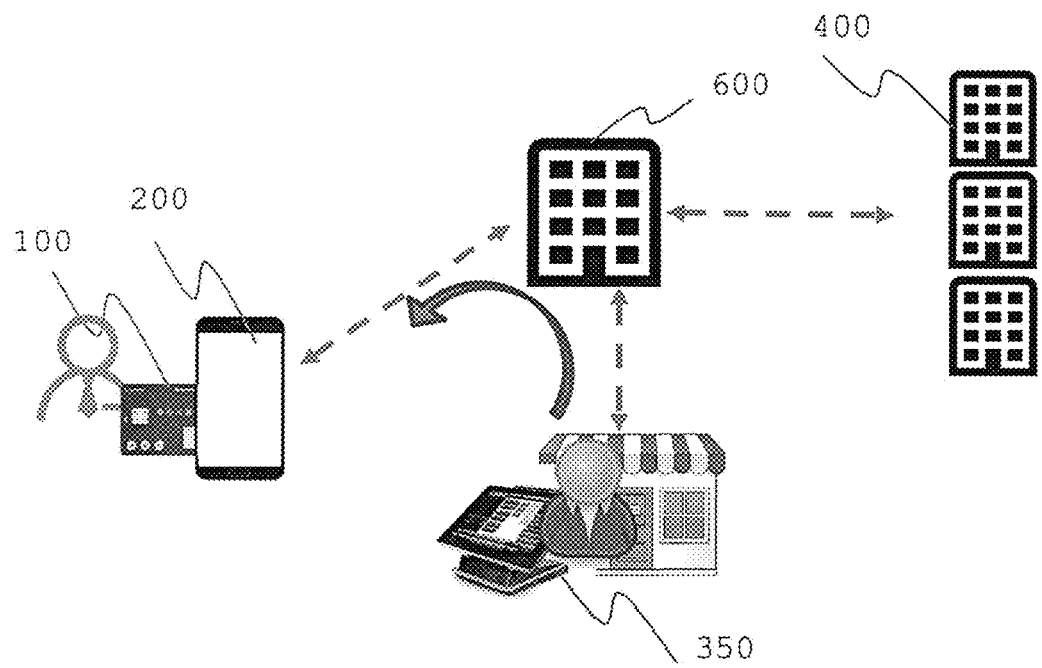
FIG. 11 shows a system for a customer initiated payment transaction according another embodiment of the present invention.

FIGS. 9, 10, and 11 show payment transaction systems according to the present invention that incorporate a customer initiated mobile terminal (CIMT) portal 600. The CIMT portal 600 may include one or more servers that facilitate payment from a mobile device 200 to a merchant 300 through multiple payment methods. The CIMT portal 600 may be alternatively described as a multi-payment gateway. As shown in FIG. 9, a customer having a payment card 100 may make a payment to a merchant 300 using a mobile device 200. In the system illustrated in FIG. 9, the merchant 300 may initiate the payment transaction on the mobile device 200 of the customer in as an alternative to using a separate point-of-sale (POS) device 350. The payment transaction may further include a step of the mobile device 200 requesting payment to the CIMT portal 600. Additionally, the CIMT portal 600 may request payment to a payment vendor 400. Such a payment vendor 400 may have a role similar to the acquirer and issuer described above and may be a business entity such as a bank, a cryptocurrency, a loyalty points issuer, a gift card issuer, a local payment vendor, or the like. As illustrated in FIG. 9, the system allows a customer to make payments to a merchant regardless of a wired network of the merchant because the system shown provides a replacement for the traditional POS system.

As shown in FIG. 10, the system for customer initiated payment transactions may include a payment transaction process including steps of: a customer launching a digital wallet on a mobile device 200; the digital wallet receiving merchant information and payment information of a merchant 300; the digital wallet receiving a payment method selection for payment; the digital wallet generating a payment authorization request based on the merchant information and the payment method selection; the digital wallet sending the payment authorization request to the CIMT portal 600; the CIMT portal 600 communicating to the merchant 300 a result of a payment transaction; an the digital wallet receiving a result of the payment authorization request from the CIMT 600. As shown in FIG. 10, the CIMT portal may communicate with a payment vendor 400. Examples of a payment vendor 400 include credit card vendors, a bank, cryptocurrency such as Bitcoin, loyalty points issuer, gift card issuer, and the like.

The digital wallet as used herein may be used to describe an electronic wallet such as a cryptocurrency wallet. In the case of cryptocurrency, the digital wallet may facilitate transaction of cryptocurrency between a customer and the merchant via a multi-payment gateway/CIMT portal 600 or the exchange of cryptocurrency to a currency accepted by the merchant 300. In one or more embodiments, the digital wallet may be an application that is installed on a mobile device 200 of the customer.

In addition to a system where the merchant 300 inputs merchant information and payment information into a digital wallet of a customer's mobile device 200 as shown in FIG. 10, a merchant's point-of-sale (POS) device 350 may be used to transfer merchant information and payment information to a customer's mobile device 200. Such a system is shown in FIG. 11 of the drawings. A payment transaction in such a system may include the steps of: the merchant point-of-sale device 350 receiving payment information; the digital wallet of the customer's mobile device 200 sending to the merchant point-of-sale device 350 customer identification; the multi-payment gateway 600 receiving from the merchant point-of-sale device 350 the merchant information and the payment information; the digital wallet receiving the merchant information and the payment information from the multi-payment gateway 600; and the digital wallet receiving a payment method selection for payment from the customer.

Advantageously, the payment transaction system of the present invention may be implemented with a pre-existing POS device 350 of a merchant 300 as shown in FIG. 10; alternatively, a POS device 350 need not be used as shown in FIG. 9.

FIG. 11 illustrates aspects of one or more embodiments of the present invention wherein a merchant 300 receives and sends information to a CIMT portal 600. According to this system, payment information is sent to the CIMT portal 600, which in turn transfers the payment information to the customer mobile device 200. For example, a digital wallet of the mobile device 200 may receive payment information from the CIMT portal, which receives the payment information from a merchant POS device 350. As in the systems described above, the payment vendor 400 of communicates with the CIMT portal 600 to authorize and a payment between the customer and merchant.

Figure 12:
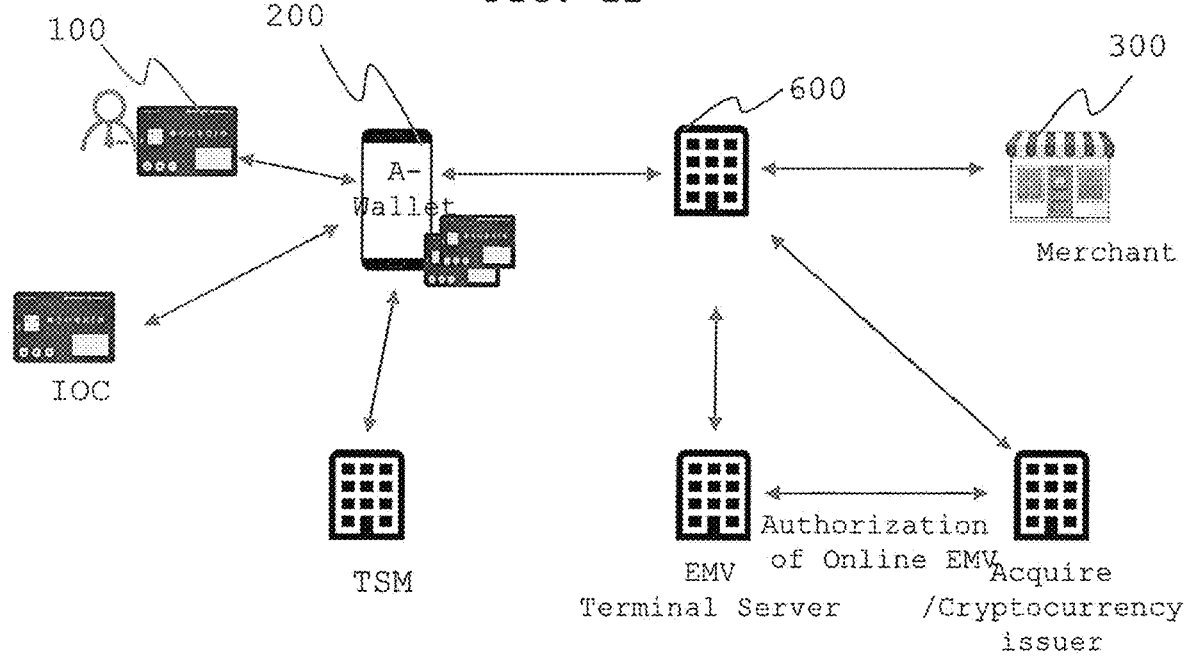
FIG. 12 shows a system for a customer initiated payment transaction according to another embodiment of the present invention.

A digital wallet of the mobile device 200 may facilitate payment by a plurality of payment means. In FIG. 12, a digital wallet is designated as an "A-Wallet." The A-Wallet may be registered by multiple payment methods. The multiple payment methods may include a credit card having an NFC chip for NFC payments. Another payment method may be an IOC, which enables payment via a Bluetooth network. An MFD card 100 having multiple payment cards as described above may also be registered to be used by the A-Wallet. Additionally, an over-the-air (OTA) card issued by a trusted server manager (TSM) may be registered on the A-Wallet. Other virtual cards, such as those associated with a loyalty point program or a mileage program may be registered to the A-Wallet. As shown in FIG. 12, the mobile device 200 having the A-Wallet communicates with the multi-payment gateway (MPG) 600 during a payment transaction. Advantageously, the system of the present invention allows for payment transaction using various technologies.

Additionally, a variety of payment currencies may be used in the system. Such currencies include but are not limited to conventional currencies, cryptocurrency, and loyalty points. For credit card payments, the MPG 600 may authorize payment to a merchant 300 by communication with a EMV Terminal Server. For cryptocurrency and loyalty points payments, the MPG 600 may communicate with an appropriate acquirer, such as a cryptocurrency issuer. Additionally, such an acquirer may communicate with the EMV terminal server.

Figure 13:
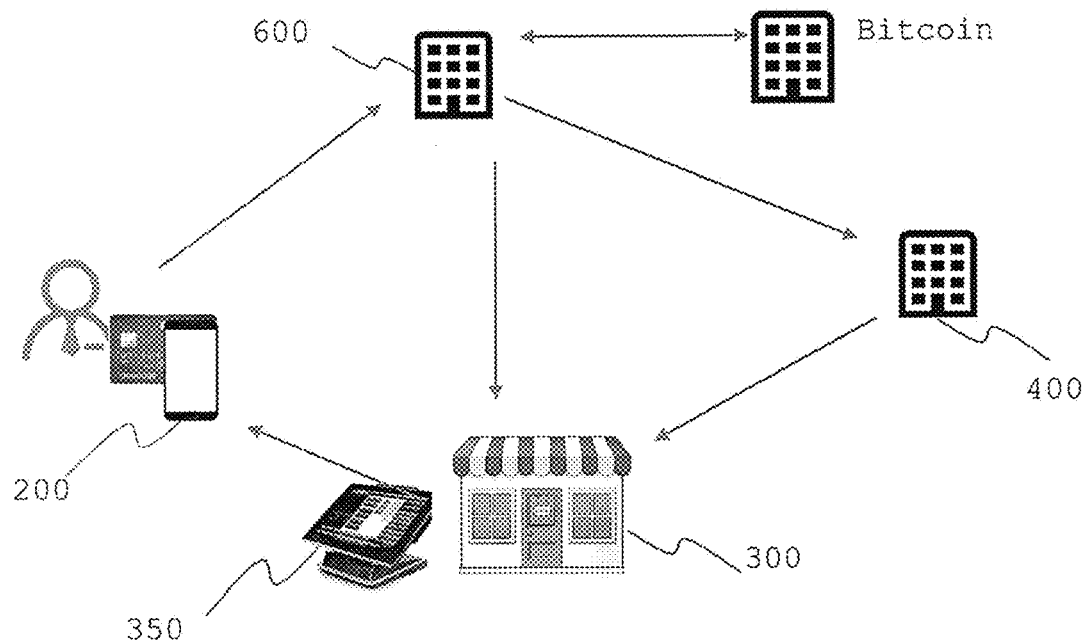
FIG. 13 shows a system for a payment transaction using cryptocurrency according to another embodiment of the present invention.

Cryptocurrency may include Bitcoin or another cryptocurrency. FIG. 13 shows a system for a payment transaction using Bitcoin according to the present invention. It is to be understood that another form of cryptocurrency may be alternatively or additionally used in the present invention.

As illustrated in FIG. 13, after receiving payment information and merchant information from the merchant POS device 350, the digital wallet of the mobile device 200 of the customer may send a cryptocurrency payment request to the MPG 600 using a public cryptographic address of the MPG 600. The value of the cryptocurrency may be calculated by an exchange rate at the time of the payment and cryptocurrency used for payment may be exchanged to a currency accepted by the merchant. If the MPG 600 has a pre-existing contract for payment with the merchant, the MPG 600 may facilitate the payment directly with the merchant 300. If the merchant 300 does not have such a contract, the MPG 600 may request payment to a credit card company 400 or a bank having a payment method accepted by the merchant 300, which in turn may communicate the payment transaction with the merchant 300. Accordingly, cryptocurrency may be used by the customer for a payment, but the merchant 300 may receive a currency that is not cryptocurrency.

Figure 14:
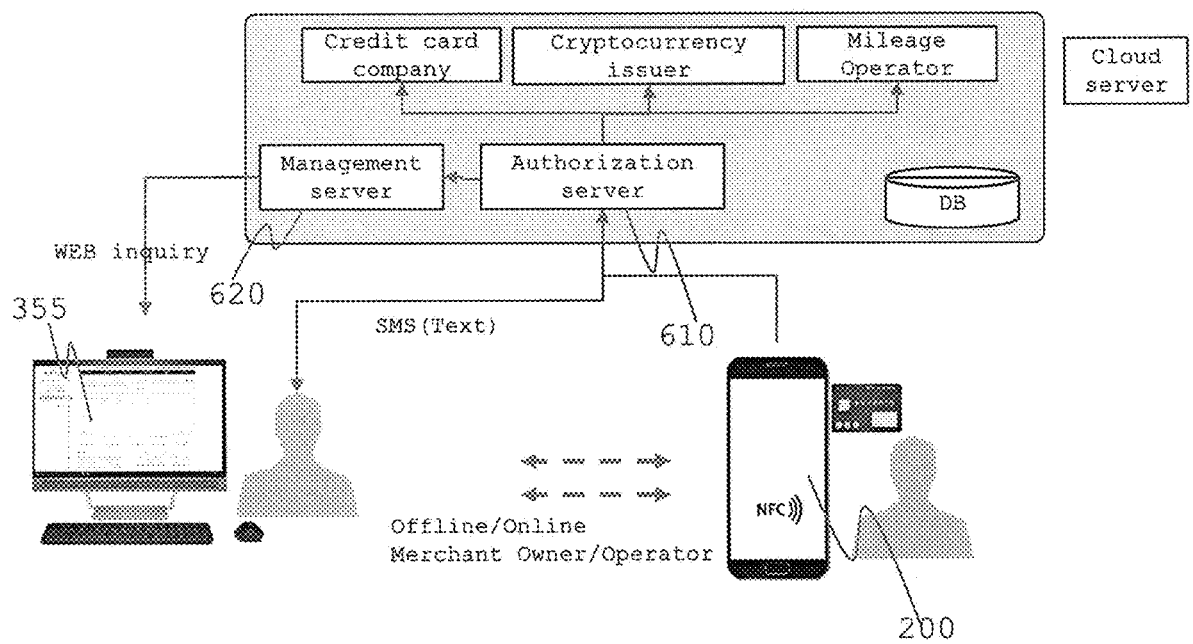
FIG. 14 shows a system for a payment transaction implementing multiple payment methods according to the present invention.

FIG. 14 shows another diagram implementing multiple payment methods using a multiple-payment gateway 600, which in FIG. 14 is embodied by the authorization server 610 and the management server 620. The diagram shows different payment methods enabled by entities such as a credit card company, a cryptocurrency issuer, or a mileage operator (issuing loyalty points in the form of mileage points) in communication with an authorization server, which communicates with a management server 620 and a merchant 300. The merchant 300 may inquire and view the result of payment transactions using a merchant management system 355, which may provide payment transaction information based on a database of the payment transaction system. The authorization server 610 may also be in communication with a mobile device 200 of the customer, which provides to the authorization server 610 a payment method selection and customer information. The authorization server may communicate to the merchant 300 payment transaction information by a messaging service such as SMS text messages. Other messaging services such as internet-protocol based messaging services may be used to communicate with the merchant 300.

Figure 15:
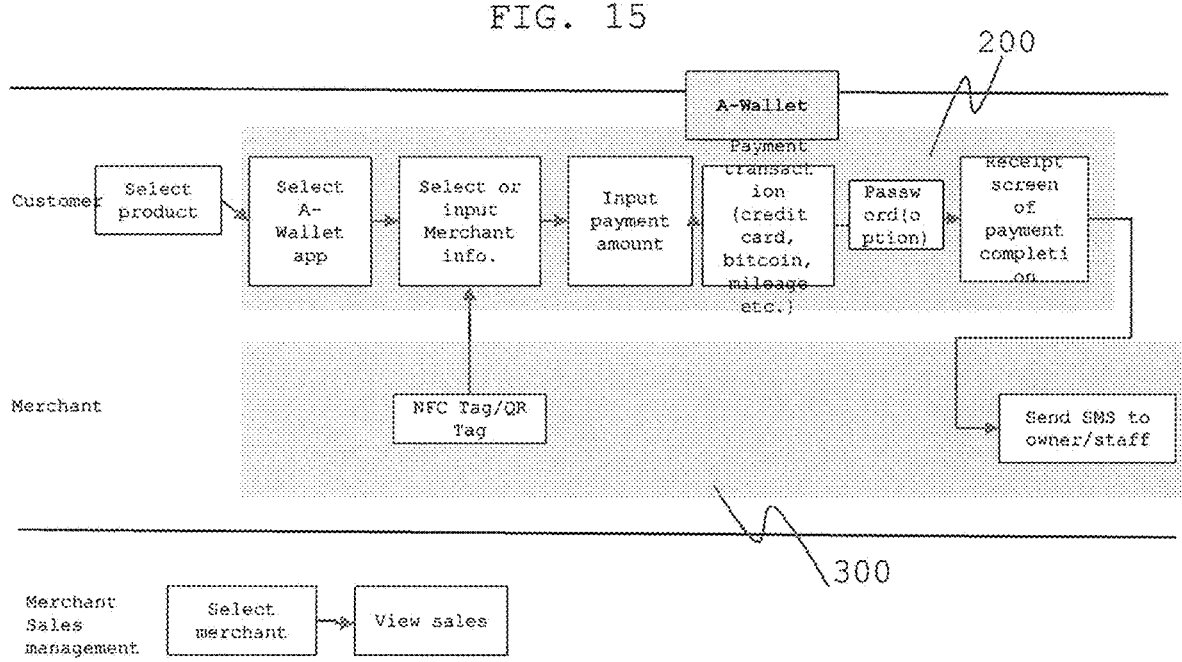
FIG. 15 shows a process for a payment transaction for a purchase from an offline merchant according to the present invention.

FIGS. 15-20 show various processes for payment transactions according to embodiments of the present invention. FIG. 15 shows a process for a payment transaction for a purchase from an offline merchant 300. In this example, a digital wallet, in the form of a mobile payment application on an iOS or Android operating system is installed on a mobile device 200 of the customer. Additionally, a form of payment, such as a credit card, is registered on the digital wallet. The merchant 300 may include merchant information. Such merchant information may be communicated to the digital wallet via NFC tag of the merchant 300 or a QR tag of the merchant 300.

In the process illustrated in FIG. 15, the customer may select a product for purchase. Upon launching the digital wallet, A-Wallet, on a mobile device 200, the customer may receive merchant information by scanning the merchant QR code or by NFC. The customer may then input a payment amount and a payment method. Optionally, the digital wallet may require a password for an added layer of security. Finally, the digital wallet may display a receipt screen of payment completion and send a message to the merchant. For example, the digital wallet may send an SMS message to a mobile device of the merchant 300. As another part of the payment transaction system, the merchant may view sales on the merchant sales management viewer as described earlier.

Figure 16:
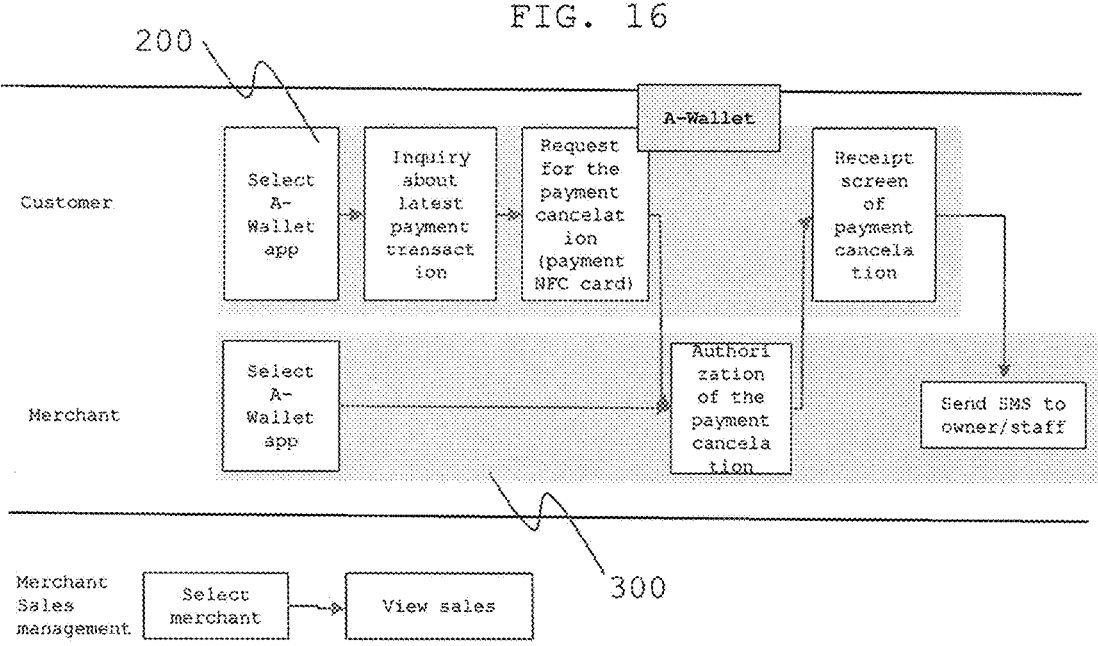
FIG. 16 shows a process for a cancellation of a purchase from an offline merchant according to the present invention.

Such a payment transaction may be canceled upon request of the customer, as illustrated in FIG. 16. According to such embodiments of the present invention, the customer may select the digital wallet, A-wallet, and inquire about his latest payment transaction. For a payment cancellation, the digital wallet may send a payment cancellation request to the merchant 300. For example, in case the customer wishes to receive a refund for a purchase, the customer may use card information from an NFC card to request cancellation through NFC to the merchant POS device or a merchant digital wallet of a merchant mobile device. In turn, the merchant may authorize the payment cancellation, and the digital wallet of the customer may display a receipt screen of the payment cancellation completion. As described above, the customer digital wallet may send a confirmation message to the merchant 300 and the merchant 300 may view results of the cancellation on a merchant sales management viewer.

Figure 17:
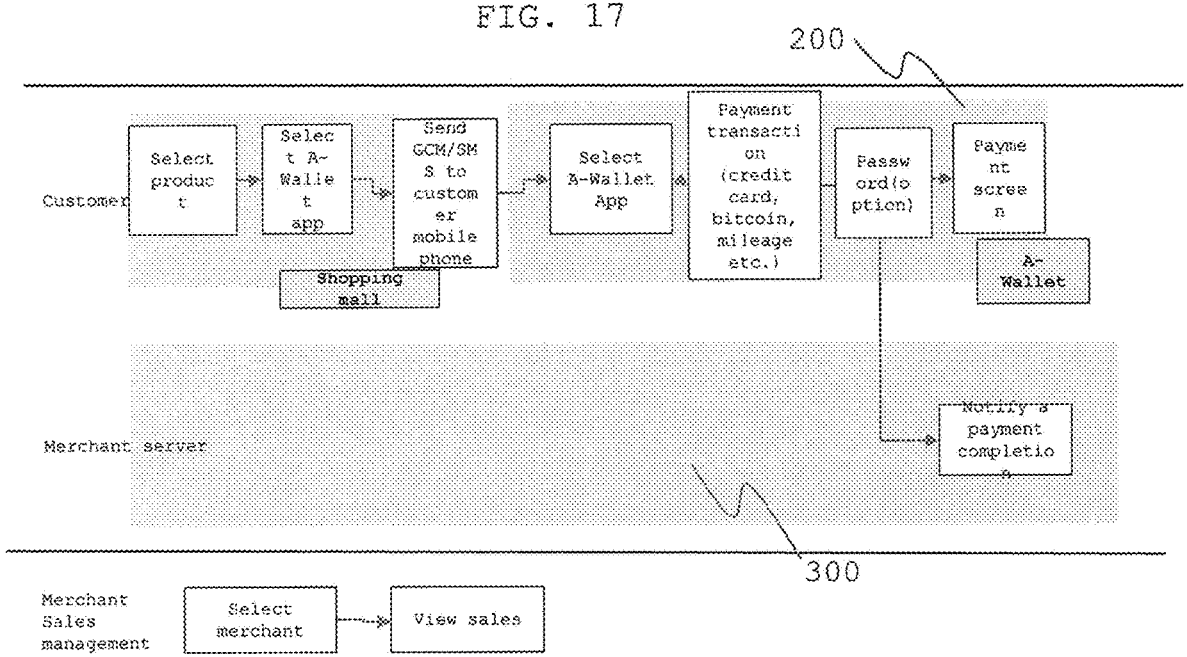
FIG. 17 shows a process for a payment transaction from a customer's personal computer according to the present invention.

FIG. 17 shows a process for a payment transaction for a purchase from an online merchant when the customer makes the purchase using a personal computer (PC). In this example, a digital wallet, in the form of a mobile payment application on an iOS or Android operating system is installed on a mobile device 200 of the customer. Additionally, a form of payment, such as a credit card, is registered on the digital wallet.

In the process illustrated in FIG. 17, the customer may select a product for purchase in an online shopping mall and select payment by a digital wallet, A-Wallet. The customer may receive a message by a messaging service such as GCM or SMS on the customer's mobile device form the online shopping mall. The customer may select the digital wallet and input a payment amount and a payment method in the digital wallet. Optionally, the digital wallet may require a password for an added layer of security. Finally, the digital wallet may display a receipt screen of payment completion and send a message to the merchant. For example, the digital wallet may send an SMS message to a mobile device of the merchant 300. As another part of the payment transaction system, the merchant may view sales on the merchant sales management viewer as described earlier.

Figure 18:
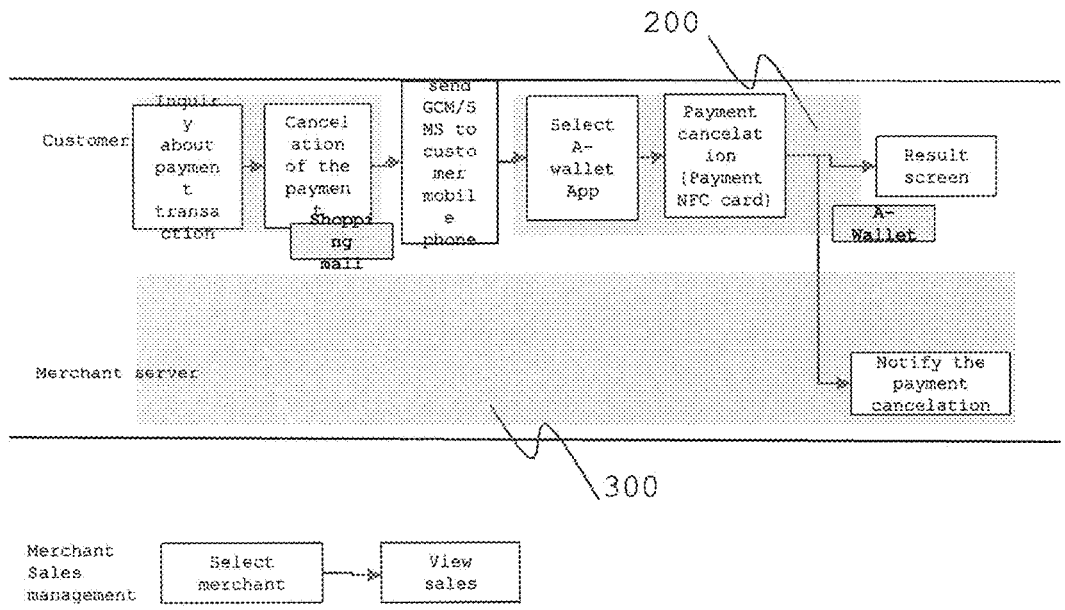
FIG. 18 shows a process for a cancellation of a payment transaction from a customer's personal computer according to the present invention.

FIG. 18 illustrates a process of a cancellation of an online purchase. The customer may inquire about a payment transaction in an online shopping mall and request cancellation of a payment. The customer may receive a message by GCM or SMS for confirmation of a payment cancellation. The customer may then launch the digital wallet, A-Wallet, and select a payment cancellation, for example, of a payment by a NFC credit card. The digital wallet may then display a result screen to confirm the cancellation and notify the merchant 300 of the payment cancellation. Such a cancellation may be reflected in the merchant sales management viewer.

FIG. 19 shows a process for a purchase on a mobile shopping platform according to the present invention. In a mobile shopping mall, the customer may select a product for purchase. The customer may then launch a digital wallet, A-Wallet, on the mobile device and select a payment transaction method, such as a credit card, Bitcoin, or mileage points. Other payment methods may be used. The digital wallet may optionally request a password for authorizing the payment transaction. Finally, the digital wallet may display a result screen and notify the merchant 300 of the payment completion.

It is to be understood that a password as used throughout this disclosure may include an alphanumeric password of a predetermined length, but may be an additional or alternative form of security, such as a fingerprint scan or facial recognition feature.

FIG. 20 shows a process for a cancellation of a payment transaction from a mobile shopping platform according to the present invention. Such a process may include the customer inquiring of the payment transaction in a mobile shopping mall and canceling the payment. In turn, a digital wallet may be launched to proceed with the payment cancellation. Finally, the digital wallet may display a result screen and notify the merchant 300 of the cancellation.

FIG. 21 shows exemplary screens on a digital wallet of a customer's mobile device 200 during a process for an offline payment authorization using the mobile phone 200 according to the present invention. First, a global positioning system (GPS) sensor of the mobile phone may be activated to detect the customer's location. The digital wallet may display a list of merchants 300 that are in close vicinity of the customer. As a way of example, in FIG. 21, the digital wallet suggests "CU Yeouido Branch" and "Good Pharmacy" as possible merchants based on the customer's location. Additionally, the customer may manually input a merchant ID if the merchant 300 is not one suggested by the digital wallet. Merchant information may also be scanned in using a merchant information QR code. Additionally, or alternatively, merchant information may be received by the digital wallet of the customer's mobile device 200 by another communication network such as NFC or Wi-Fi.

Next, the customer may input a payment amount into the digital wallet. The customer may also select a payment method. In FIG. 21, a contactless credit card is selected the digital wallet prompts the customer to scan the payment card. As described above, one or more of other payment methods may be used according to various embodiments of the present invention.

Next, the digital wallet may prompt the customer to input a password for the selected payment option. In the example shown in FIG. 22, the digital wallet prompts the user to enter the first two digits of the password. As described above, various other kinds of passwords may be used to authorize payment. Alternatively, "one-click" payment methods may be used, wherein payments are made without entering additional passwords. Upon completion of payment, the digital wallet may display a payment receipt, which may be saved to the mobile device.

Figure 22:
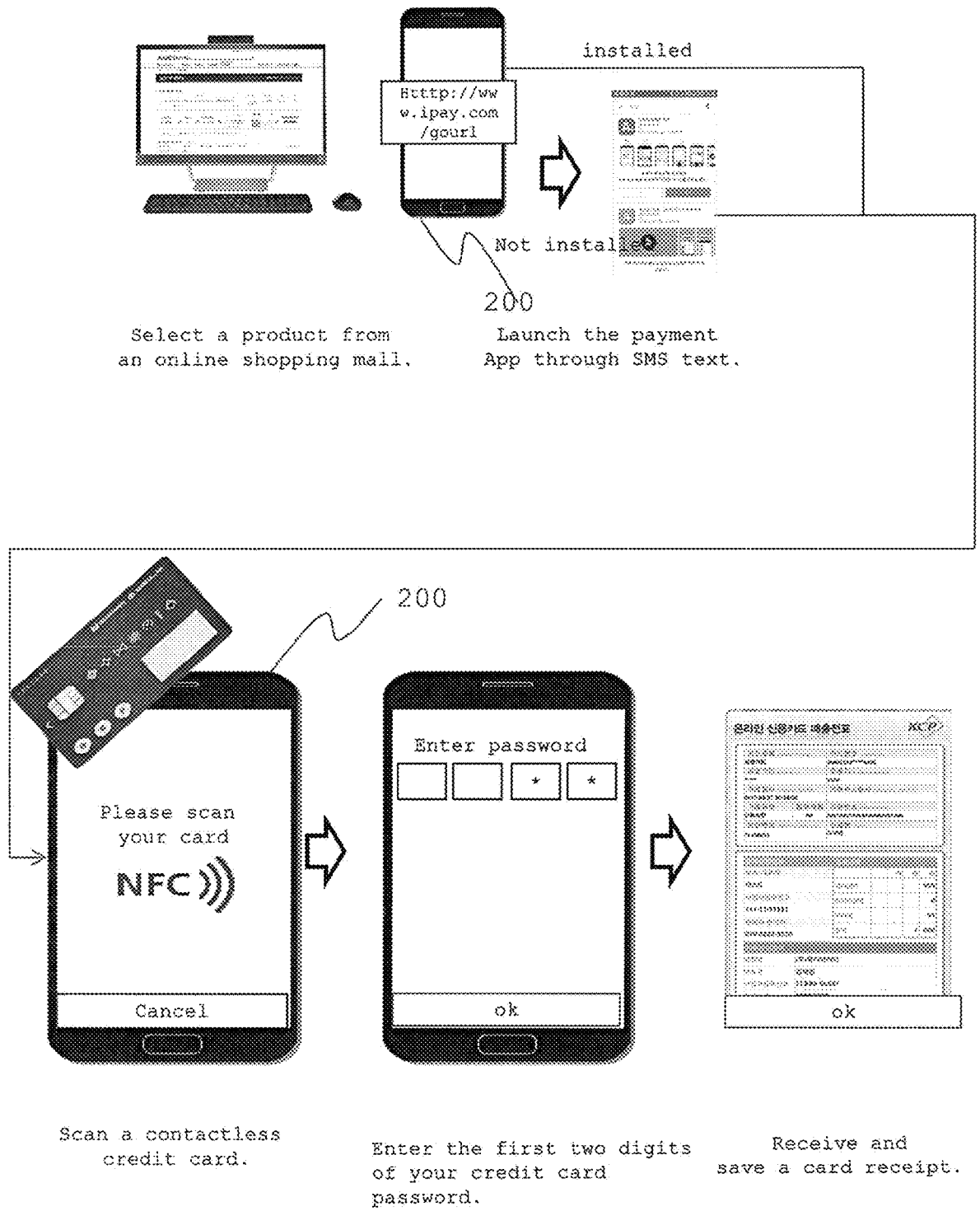
FIG. 22 shows a process for a payment authorization via a personal computer according to the present invention.

FIG. 22 shows a process for a payment authorization via a personal computer according to the present invention. First, a customer may select a product from an online shopping mall and launch the digital wallet upon receipt of a message from a messaging service. For example, the online shopping mall may send a SMS text to the customer to complete a payment transaction. If a digital wallet application is not installed on the mobile device 200, the mobile device 200 may direct the customer to an application marketplace to provide the customer an option to download and install the digital wallet.

Next, the customer may select a method of payment such as a NFC card. The digital wallet may optionally require the customer to input a password. As described above, the digital wallet may display a payment receipt upon completion of the payment transaction.

Figure 23:
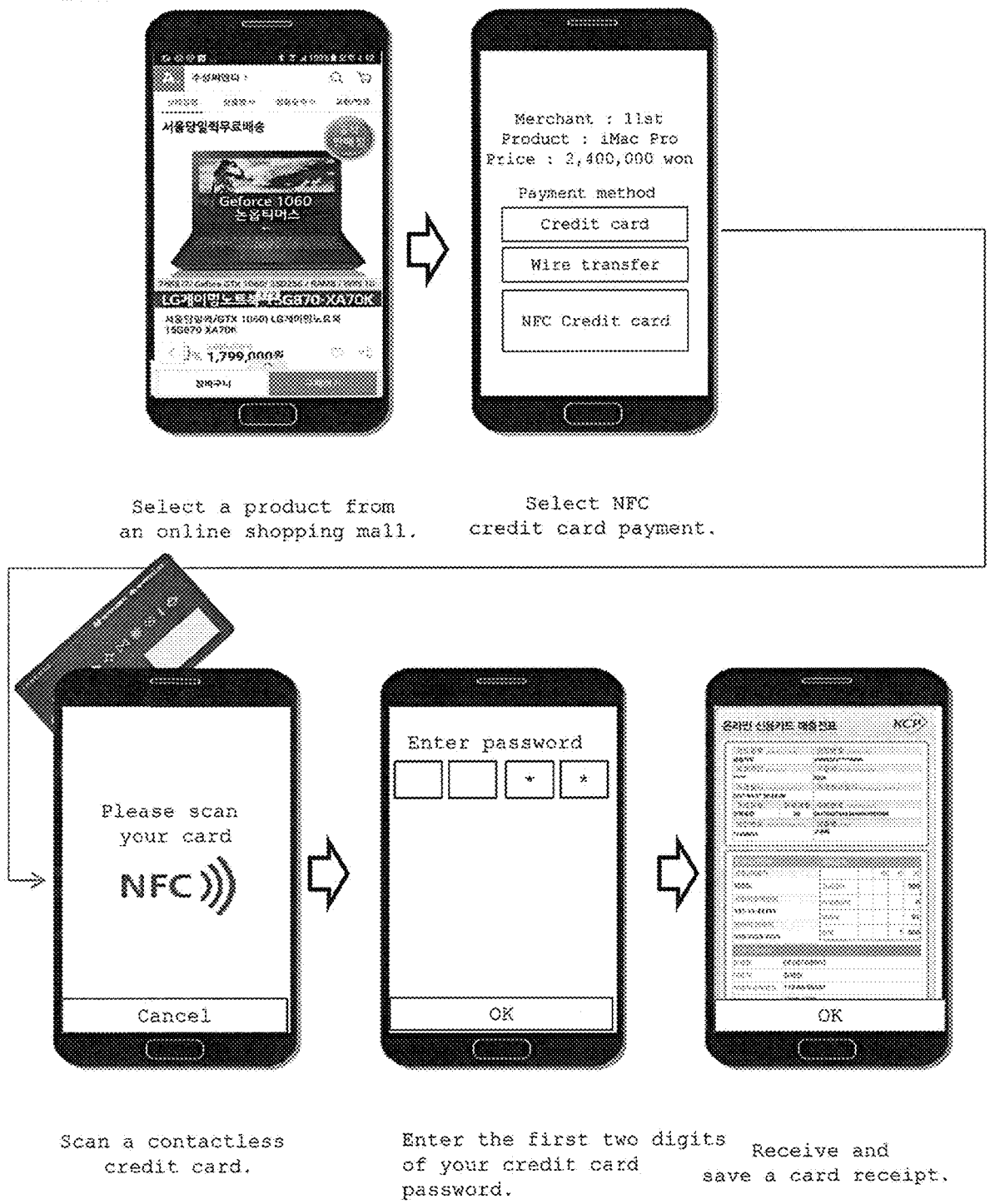
FIG. 23 shows a process for a payment authorization via a mobile device according to the present invention.

Similarly, FIG. 23 shows a process for a payment authorization via a mobile device according to the present invention. The customer may select a product from an online shopping mall available on the mobile device 200. The digital wallet may then prompt the customer to select a payment option. In the example shown in FIG. 23, the mobile device 200 displays "credit card," "wire transfer," and "NFC credit card" as possible payment options, but other payment options such as cryptocurrency may be used. If a NFC card is selected, the selected card may be scanned as shown in FIG. 23. As described above, the digital wallet may prompt the customer to input a password or a partial password. Upon completion of the payment transaction, the customer may view and save a payment receipt on the mobile device 200.

Figure 24:
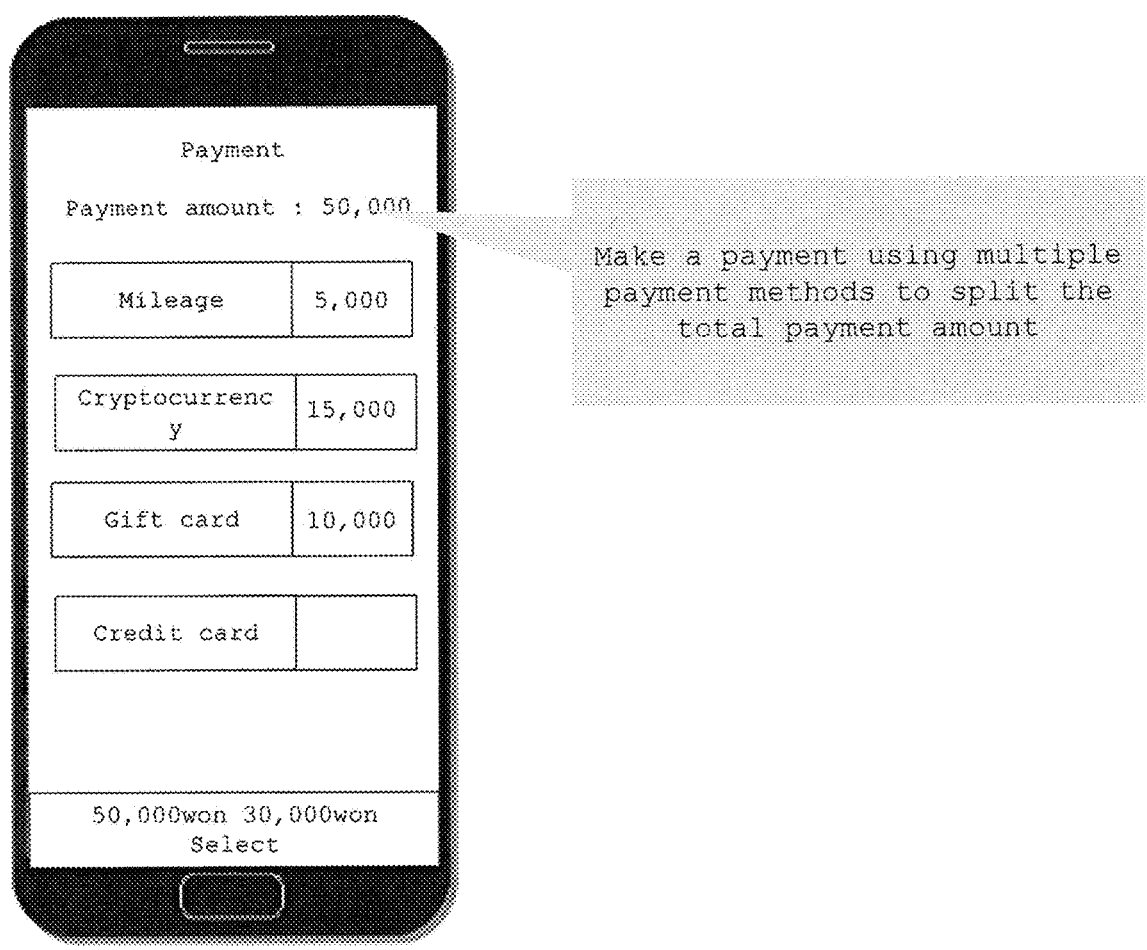
FIG. 24 shows a payment method selection screen according to the present invention.

An advantageous feature of the system having the multi-payment gateway 600 is that the customer may select a plurality of different payment options to make a payment. For example, FIG. 24 shows a payment method selection screen according to the present invention, wherein a purchase may be split into payments from mileage points, cryptocurrency, a gift card, and a credit card. Such purchases may be paid from different percentages of various payment accounts. Such a payment option is facilitated by the multi-payment gateway 600.

Figure 26:
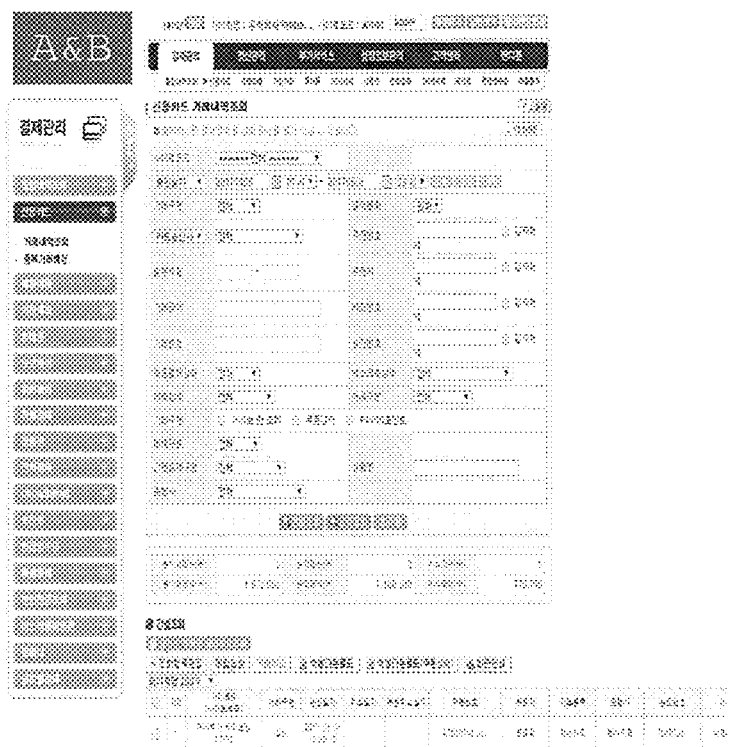
FIG. 26 is an image showing an exemplary screen for viewing account balances for multiple payment options according to the present invention.

FIGS. 25 and 26 show exemplary screens for the merchant management viewers of the merchant 300 as described above. FIG. 25 illustrates a screen showing total sales history by date. FIG. 26 illustrates a screen showing sale history for various factors including certain credit card transactions, customer initiated payments, payments by reward points of a loyalty points program, cryptocurrency, and the like.

Figure 27:
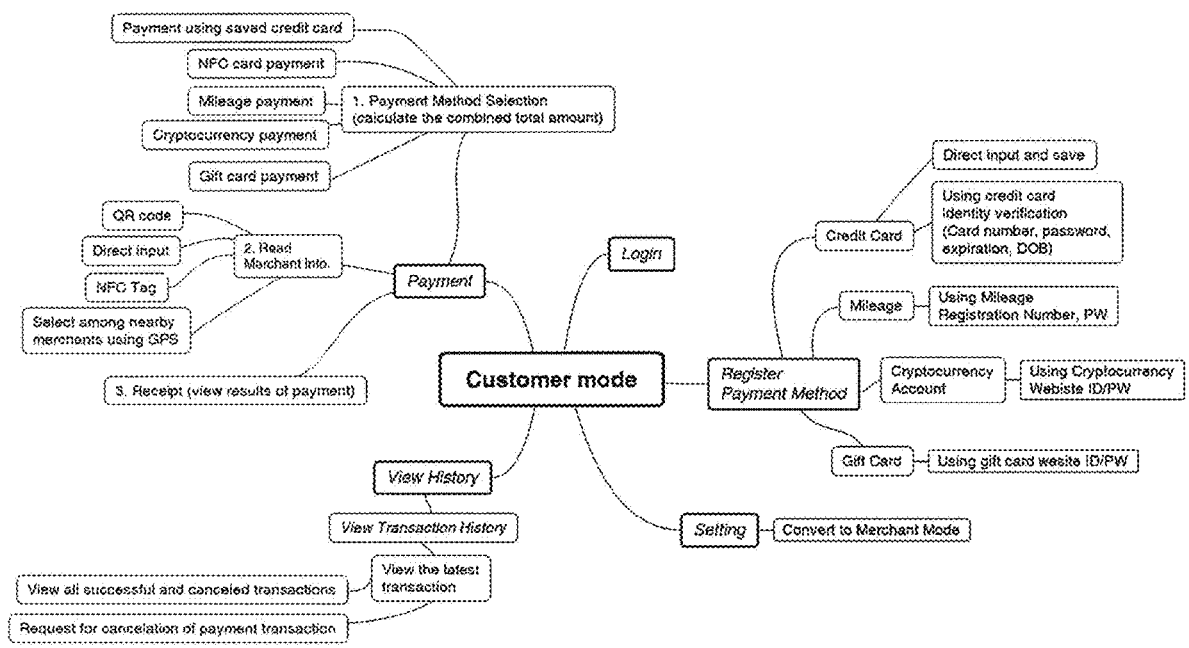
FIG. 27 is a diagram showing processes for using a payment transaction application in a customer mode according to the present invention.

FIG. 27 is a diagram showing an overview of processes for using a payment transaction application, such as a digital wallet, in a customer mode according to the present invention. As a customer, the digital wallet provides the options of: login, register payment method, settings, payment, and view history.

Types of payment methods that may be registered include credit cards, mileage points, cryptocurrency, and gift cards. For registering a credit card, the digital wallet may require input of credit card information and identify verification (e.g., card number, password, expiration, date of birth, etc.). Registering mileage may include inputting a mileage registration number and a password. Registering cryptocurrency may include inputting a login ID and password for a cryptocurency exchange website. For registering a gift card, the customer may input an identification and a password.

Payment by the digital wallet includes payment method/methods selection, receiving merchant information, and receiving payment confirmation. Payment method selection includes, but is not limited to, credit card, NFC card, mileage, cryptocurrency, and a gift card. Merchant information may be received by direct input, a QR code, a NFC tag, or be selected among nearby merchants using GPS.

Figure 28:
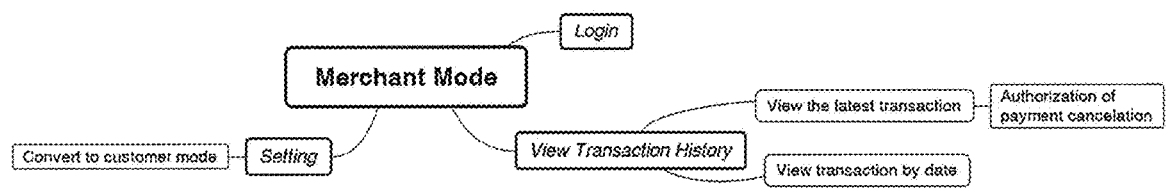
FIG. 28 is a diagram showing processes for using a payment transaction application in a merchant mode according to the present invention.

The customer may also view transaction history in the digital wallet, including a list of requested, completed, and canceled transactions. A payment cancellation may be requested by the customer Under the digital wallet's settings, the digital wallet may be switched to a merchant mode. FIG. 28 is a diagram showing processes for using a digital wallet, a payment transaction application, in a merchant mode according to the present invention. Merchant options include authorization of payment cancellation.

Figure 29:
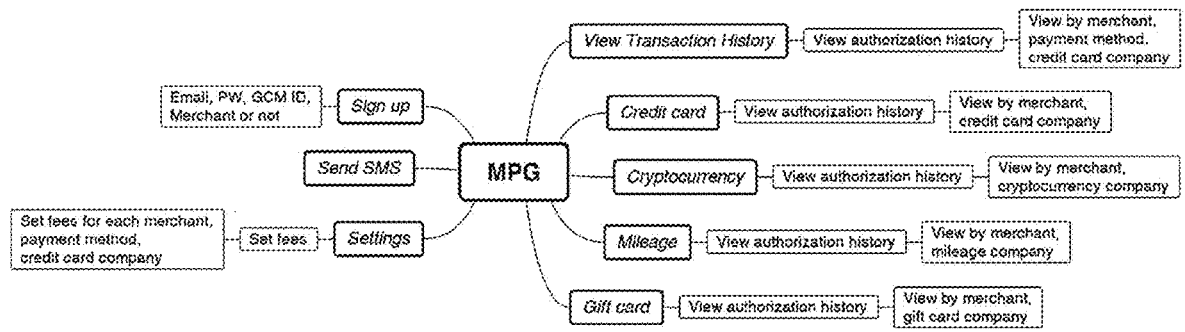
FIG. 29 is a diagram showing processes for using a payment transaction application in a multi-payment gateway mode.

FIG. 29 is a diagram showing processes for using a payment transaction application in a multi-payment gateway (MPG) mode. As shown in FIG. 29 and described above, the multi-payment gateway plays a central role in the various embodiments of the present invention. The multi-payment gateway may sign up merchants and set fees for merchants, payment methods, and various credit card companies. Additionally, the multi-payment gateway may view transaction history and provide the information for the transaction history viewed by the merchant and various payment entities, such as credit card companies, cryptocurrency issuers, mileage points companies, and gift card companies.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A customer-initiated payment transaction system for transacting customer-initiated payments, the system comprising:
 a mobile device of a customer, the mobile device comprising a digital wallet and a near-field communication (NFC) device;
 a multi-payment gateway affiliated with the customer;
 a network;
 a server having a database; and
 a multi-function device (MFD) card of the customer comprising a NFC antenna wherein the MFD card stores MFD card information corresponding to a plurality of payment methods, wherein a customer-initiated payment transaction comprises the steps of:
the MFD card activating the digital wallet for processing the customer-initiated payment transaction wherein the mobile device receives the MFD card information from the MFD card via NFC between the MFD card and the mobile device;
the digital wallet receiving merchant information and payment information of a merchant by the digital wallet communicating with the merchant via one of:
NFC, the merchant further comprising a NFC tag; and
quick read (QR) code scanning, the merchant further comprising a QR tag;
the digital wallet receiving a payment method selection from the customer for payment;
the digital wallet generating a payment authorization request based on the merchant information and the payment method selection;
the digital wallet sending the payment authorization request to the multi-payment gateway;
the multi-payment gateway directly or indirectly communicating to the merchant a result of the customer-initiated payment transaction; and
the digital wallet receiving a result of the payment authorization request from the multi-payment gateway, wherein activating the digital wallet by the MFD card includes transferring a chip serial number of the MFD card, or a card serial number of the MFD card, from the MFD card to the mobile device,
wherein the digital wallet is activated for processing the payment transaction if the transferred chip serial number of the MFD card or the transferred card serial number of the MFD card matches the chip serial number of the MFD card or the card serial number of the MFD card stored in the mobile device,
wherein the merchant information is stored in the database, and wherein the mobile device obtains geolocation data of the merchant using a global positioning sensor of the mobile device and sends the geolocation data to the server, and in response, the server searches for and retrieves the merchant information corresponding to the geolocation data and sends the merchant information to the mobile device.

2. The customer-initiated payment transaction system of claim 1, wherein the payment methods include one of a credit card, a debit card, a prepaid cash card, or a loyalty points program card.

3. The customer-initiated payment transaction system of claim 2, wherein the account stored on the MFD card is a plurality of accounts and each account is one of a credit card, a debit card, a prepaid cash card, or a loyalty points program card.

4. The customer-initiated payment transaction system of claim 1, wherein the mobile device does not store the MFD card information prior to the step of the MFD card activating the digital wallet.

5. The customer-initiated payment transaction system of claim 1, wherein the payment method selection is a cryptocurrency and the merchant information includes a merchant public key.

6. The customer-initiated payment transaction system of claim 1, wherein the payment method selection is a cryptocurrency and the payment transaction further comprise the steps of:
the multi-payment gateway requesting to a cryptocurrency exchange an exchange of the customer's cryptocurrency to a currency accepted by the merchant; and
the merchant receiving the exchanged currency.

7. The customer-initiated payment transaction system of claim 1, wherein the payment method selection is an account for an integrated loyalty points system.

8. The customer-initiated payment transaction system of claim 1, wherein the payment method selection is a plurality of payment methods and the customer-initiated payment transaction further comprises the steps of:
the digital wallet receiving multi-payment information including an amount to be deducted from each of the plurality of payment methods; and
the multi-payment gateway receiving the multi-payment information from the digital wallet.

9. The customer-initiated payment transaction system of claim 1, wherein the customer-initiated payment transaction further includes the step of:
the customer launching the digital wallet on the mobile device.

10. The customer-initiated payment transaction system of claim 1, wherein a cancellation of the customer-initiated payment transaction comprises the steps of:
the customer launching the digital wallet on the mobile device;
the digital wallet requesting to the multi-payment gateway a status inquiry of the customer-initiated payment transaction;
the digital wallet requesting to the multi-payment gateway the cancellation of the customer-initiated payment transaction;
the multi-payment gateway receiving an authorization of the cancellation of the customer-initiated payment transaction from the merchant;
the digital wallet receiving from the multi-payment gateway the authorization of the cancellation;
the digital wallet displaying a confirmation notification of the cancellation of the customer-initiated payment transaction on the mobile device; and
the multi-payment gateway sending a message to the merchant of the cancellation.

11. A payment transaction system for transacting payments, the system comprising:
a mobile device of a customer, the mobile device comprising a digital wallet and a near-field communication (NFC) sensor;
a merchant having a merchant point-of-sale device, merchant information, and payment information;
a multi-payment gateway affiliated with the customer;
a network;
a server having a database; and
a multi-function device (MFD) card of the customer comprising a NFC antenna wherein the MFD card stores information corresponding to a plurality of payment methods,
wherein the mobile device receives MFD card information from the MFD card via NFC between the card and the mobile device, wherein a payment transaction comprises the steps of:
the merchant point-of-sale device receiving the payment information;
the MFD card activating the digital wallet for processing the payment transaction;
the digital wallet sending customer identification to the merchant point-of-sale device;
the multi-payment gateway receiving the merchant information and the payment information from the merchant point-of-sale device;

the digital wallet receiving the merchant information and the payment information from the multi-payment gateway; and the digital wallet receiving a payment method selection for payment from the customer, wherein the digital wallet is activated for processing the payment transaction via NFC between the MFD card and the mobile device, wherein activating digital wallet by the MFD card includes transferring a chip serial number of the MFD card, or a card serial number of the MFD card, from the MFD card to the mobile device, wherein the digital wallet is activated for processing the payment transaction if the transferred chip serial number of the MFD card or the transferred card serial number of the MFD card matches the chip serial number of the MFD card or the card serial number of the MFD card stored in the mobile device, wherein the merchant information is stored in the database, and wherein the mobile device obtains geolocation data of the merchant using a global positioning sensor of the mobile device and sends the geolocation data to the server, and in response, the server searches for and retrieves the merchant information corresponding to the geolocation data and sends the merchant information to the mobile device.

12. The payment transaction system of claim 11, wherein the digital wallet comprises one or more of a registered NFC payment card, a registered Bluetooth payment card, and a registered OTA card.

13. The payment transaction system of claim 11, wherein the account stored on the MFD card is one of a credit card, a debit card, a prepaid cash card, or a loyalty points program card, wherein the account stored on the MFD card is a plurality of accounts and each account is one of a credit card, a debit card, a prepaid cash card, or a loyalty points program card, wherein the digital wallet is activated for processing the customer-initiated payment transaction via NFC between the MFD card and the mobile device.

14. The payment transaction system of claim 11, wherein the payment method selection is a cryptocurrency and the merchant information includes a merchant public key.

15. The payment transaction system of claim 11, wherein the payment method selection is a cryptocurrency and the payment transaction further comprise the steps of:
the multi-payment gateway requesting to a cryptocurrency exchange an exchange of the customer's cryptocurrency to a currency accepted by the merchant; and
the merchant receiving the exchanged currency.

16. The payment transaction system of claim 11, wherein the payment method selection is an account for an integrated loyalty points system.

17. The payment transaction system of claim 11, wherein the payment method selection is a plurality of payment methods and the customer-initiated payment transaction further comprises the steps of:
the digital wallet receiving multi-payment information including an amount to be deducted from each of the plurality of payment methods; and
the multi-payment gateway receiving the multi-payment information from the digital wallet.

18. The payment transaction system of claim 11, wherein a cancellation of the payment transaction comprises the steps of:
the customer launching the digital wallet on the mobile device;
the digital wallet requesting to the multi-payment gateway a status inquiry of the payment transaction;
the digital wallet requesting to the multi-payment gateway the cancellation of the customer-initiated payment transaction;
the multi-payment gateway receiving an authorization of the cancellation of the customer-initiated payment transaction from the merchant; the digital wallet receiving from the multi-payment gateway the authorization of the cancellation;
the digital wallet displaying a confirmation notification of the cancellation of the customer-initiated payment transaction on the mobile device; and
the multi-payment gateway sending a message to the merchant of the cancellation.

* * * * *